United States Patent
Bell et al.

(10) Patent No.: US 9,282,001 B2
(45) Date of Patent: Mar. 8, 2016

(54) POLICY BASED UTILITY NETWORKING

(75) Inventors: Ray Bell, Mill Valley, CA (US); Will Bell, Mill Valley, CA (US); Greg DesBrisay, San Carlos, CA (US); Stephen Street, San Francisco, CA (US)

(73) Assignee: Grid Net, Inc., San Francisco, CA (US)

( * ) Notice: Subject to any disclaimer, the term of this patent is extended or adjusted under 35 U.S.C. 154(b) by 18 days.

(21) Appl. No.: 12/042,159

(22) Filed: Mar. 4, 2008

(65) Prior Publication Data

US 2008/0219186 A1 Sep. 11, 2008

Related U.S. Application Data

(60) Provisional application No. 60/905,269, filed on Mar. 5, 2007.

(51) Int. Cl.

| H04L 12/24 | (2006.01) |
|---|---|
| H04L 12/46 | (2006.01) |
| H04L 29/08 | (2006.01) |
| H04L 12/28 | (2006.01) |
| H04L 29/06 | (2006.01) |
| H04L 12/40 | (2006.01) |
| H02J 13/00 | (2006.01) |

(52) U.S. Cl.
CPC ........ *H04L 41/0806* (2013.01); *H04L 12/4625* (2013.01); *H04L 67/125* (2013.01); *H02J 13/0086* (2013.01); *H04L 63/14* (2013.01); *H04L 63/20* (2013.01); *H04L 2012/4026* (2013.01); *Y04S 40/162* (2013.01); *Y04S 40/24* (2013.01)

(58) Field of Classification Search
USPC ........................................................ 370/352
See application file for complete search history.

(56) References Cited

U.S. PATENT DOCUMENTS

| 6,297,734 B1 | 10/2001 | Richardson et al. |
| 6,509,841 B1 * | 1/2003 | Colton et al. ............ 340/870.11 |
| 6,771,058 B2 * | 8/2004 | Lapinksi et al. .......... 324/117 R |

(Continued)

FOREIGN PATENT DOCUMENTS

| JP | 08-172719 A | 7/1996 |
| JP | 2001-264367 A | 9/2001 |

(Continued)

OTHER PUBLICATIONS

Author Unknown, IEC 61850-7—Communication Networks and Systems in Substations, Part 7-1: Basic Communication Structure for Substation and Feeder Equipment—Principles and Models, Draft FDIS-R2-04, Nov. 4, 2002, pp. 1-111.*

(Continued)

*Primary Examiner* — Christopher Crutchfield
(74) *Attorney, Agent, or Firm* — Goodwin Procter LLP

(57) ABSTRACT

In various embodiments, a policy-based residential networked meter can be an energy switch router device (ESRD) that provides policy-based advanced metering, load control and shaping, energy services delivery and accounting, and secure web services interfaces and internetworking communications. The ESRD can be integrated and inter-related with advanced policy-based sensory, metrology, monitoring, control, recording, classification, prioritization, security, routing, and switching functions. The ESRD may be used to sense, measure, meter, and control electrical service flows to the utility service point at the customer premise, and may be configured and managed with one or more policy-based networking methods.

13 Claims, 31 Drawing Sheets

(56) References Cited

U.S. PATENT DOCUMENTS

| | | | |
|---|---|---|---|
| 6,795,707 | B2 | 9/2004 | Martin et al. |
| 6,859,831 | B1 | 2/2005 | Gelvin et al. |
| 6,980,540 | B1 | 12/2005 | Laroia et al. |
| 7,379,456 | B2* | 5/2008 | Muranaka et al. ............ 370/389 |
| 2002/0115447 | A1 | 8/2002 | Martin et al. |
| 2003/0177389 | A1 | 9/2003 | Albert et al. |
| 2004/0133314 | A1 | 7/2004 | Ehlers et al. |
| 2005/0066033 | A1* | 3/2005 | Cheston et al. ............... 709/225 |
| 2007/0038563 | A1* | 2/2007 | Ryzerski .......................... 705/40 |
| 2007/0257813 | A1 | 11/2007 | Vaswani et al. |
| 2008/0074285 | A1* | 3/2008 | Guthrie .................... 340/870.02 |
| 2008/0127210 | A1* | 5/2008 | Bosold et al. ................. 719/313 |
| 2008/0177678 | A1 | 7/2008 | Di Martini et al. |
| 2008/0183339 | A1 | 7/2008 | Vaswani et al. |
| 2008/0219186 | A1 | 9/2008 | Bell et al. |
| 2008/0313006 | A1 | 12/2008 | Witter et al. |
| 2009/0240449 | A1 | 9/2009 | Gibala et al. |
| 2010/0008218 | A1 | 1/2010 | Dumov et al. |
| 2010/0060259 | A1 | 3/2010 | Vaswani et al. |
| 2010/0241848 | A1 | 9/2010 | Smith et al. |
| 2010/0306533 | A1 | 12/2010 | Phatak |

FOREIGN PATENT DOCUMENTS

| | | |
|---|---|---|
| JP | 2003084018 | 3/2003 |
| JP | 200423966 | 1/2004 |
| JP | 2005341646 | 12/2005 |
| JP | 2003164171 | 6/2006 |

OTHER PUBLICATIONS

Author Unknown, IEEE P1615, Draft 8, Draft Recommendation Practice for Network Communication in Electrical Power Substations, Nov. 2006, pp. 1-86.*

Todd Mander, Frank Chen, Richard Cheung, and Farhad Nabhani, Mechanism of Unlimited WAN Expansion for Networks in Power Distribution Systems, 2006 Conference on Large Engineering Systems in Power Engineering, Jul. 2006, pp. 72-76.*

M. Chaves and M. Messenger, Recommended Framework for the Business Case Analysis of Advanced Metering Infrastructure, Apr. 14, 2004, pp. 1-36.*

T. Mander, H. Cheung, A. Hamlyn, R. Cheung, New Routing Mechanism of Enabling DNP3 for Smart Distribution System Collaborative Computing, Oct. 27, 2007, 2001 IEEE Canada Electrical Power Conference, pp. 189-194.*

T. Mander, F. Nabhani, L. Wang, R. Cheung, Data Object Based Security for DNP3 Over TCP/IP for Increased Utility Commercial Aspects Security, 2007 Power Engineering Society General Meeting, Jun. 28, 2007, pp. 1-8.*

T. Mander, H. Cheung, A. Hamlyn R. Cheung, Communication Security Architecture for Smart Distribution System Operations, EPC 2007, Oct. 26, 2007, pp. 411-416.*

Author Unknown, The Integrated Energy and Communication System Architecture: vol. IV, Appendix A: Security, 2004, pp. 1-119.*

Author Unknown, The Integrated Energy and Communication System Architecture: vol. IV, 2004, pp. 1-218.*

Author Unknown, The Integrated Energy and Communication System Architecture: vol. 2, Appendix D, 2004, pp. 1-82.*

Author Unknown, Introduction to Distribution Systems, as archived by the Internet Archive on Sep. 2, 2006, pp. 1-13.*

Preliminary Report on Patentability dated Jul. 18, 2013 for PCT Application No. PCT/US2012/020096.

International Search Report mailed on Jun. 30, 2008, for PCT Application No. PCT/uS08/55933 filed on Mar. 5, 2008, 2 pages.

International Search Report & Written Opinion dated Aug. 29, 2012 for PCT Application No. PCT/US2012/020096.

International Search Report & Written Opinion Dated Feb. 28, 2012 for PCT Application No. PCT/US2011/050722.

English Abstract for Japanese No. JP-2001-264367-A, 2001.

English Abstract for Japanese No. JP-08-172719-A, 1996.

\* cited by examiner

POLICY BASED UTILITY NETWORKING

CROSS-REFERENCES TO RELATED APPLICATIONS

This application claims the benefit of and priority to U.S. Provisional Application No. 60/905,269, filed Mar. 5, 2007, the entire disclosure of which is hereby incorporated by reference for all purposes.

BACKGROUND OF THE INVENTION

Over the past ten to fifteen years, organizations have taken significant steps towards defining the technical requirements, architectures, specifications, and open standards-based common information models for the next generation intelligent transmission, distribution, and delivery infrastructures of various utilities, such as electricity, water, oil, and gas. These industry-wide advancements typically depict an intelligent network architecture that is predictive, self-adaptive, self-optimizing, fault-sensing, self-healing, and secure (e.g., an intelligent electric power grid infrastructure). The promises of these intelligent electric grid network architectures are improved reliability, enhanced energy delivery efficiencies, optimized energy conservation services, lower operational and maintenance costs, and higher levels of customer interaction and satisfaction.

Electric Power Research Institute (EPRI) IntelliGrid$^{SM}$ initiative is one attempt at creating the technical foundation for a smart power grid that links electricity with communications and computer control to achieve tremendous gains in reliability, capacity, and customer services. A major early product is the IntelliGrid Architecture, an open-standards, requirements-based approach for integrating data networks and equipment that enables interoperability between products and systems. This program provides utilities with the methodology, tools and recommendations for standards and technologies when implementing systems such as advanced metering, distribution automation, demand response, and wide-area measurement. The program also provides utilities with independent, unbiased testing of technologies and vendor products.

The problem of the current "intelligent" electric grid architectures lies in lack of definition on how to implement an end-to-end highly automated, distributed, electric power network that is predictive, self-adaptive, self-optimizing, fault-sensing, self-healing, and secure. The problem is as much a matter of scale and management, as it is a matter of how to design and implement and advanced electric power sensing, measurement, metering, and utility policy enforcement control layer (e.g., transmission and distribution control, dynamic pricing enforcement, dynamic service delivery and accounting, etc.) over a secure communications network.

In order to implement a utility policy enforcement control layer, in a scalable and efficient manner, what is required is a more than a policy-based network management platform. Policy-based networking was originally developed in the mid/late 1990s and early 2000s within the DMTF and IETF standards organizations. The focus and development efforts on policy-based networking, since its inception, have heretofore been primarily on enterprise and managed IP Services (e.g., VPN, QoS, VoIP . . . ). Policy-based networking methods, techniques, models, protocols, and policy server designs have yet to be applied to the subject domain of utility transmission & distribution network automation. In addition to the present invention of the Energy Switch Router, what is also required to implement an intelligent electric grid is a highly distributed, centrally managed, policy-based logic fabric into which utility transmission and distribution network automation policies, methods, processes, controls, systems, devices, and utility customer profiles are instantiated, managed, and deployed to form an intelligent secure electric grid network.

Accordingly, what is desired are improved methods and apparatus for solving some of the problems discussed above, while reducing further drawbacks, some of which are discussed above.

BRIEF SUMMARY OF THE INVENTION

Embodiments of the present invention generally relate to the design, functionality, and instrumentation of a new class of utility network devices, energy switch routers, and to their role and use in the networking and automation of next generation utility transmission and distribution networks and systems.

The emergent intelligent electric grid architectures require a new type of networked utility device, one that can enforce transmission and distribution automation policies in a highly distributed, centrally managed method, with the ability to support both real-time and near real-time communications. This new networked utility device needs to support advanced utility sensory and measurement functions, service monitoring and recording functions, service control and policy enforcement functions, web-based configuration and service delivery interfaces, and secure communications. Further, this new category of utility network devices need to support an evolving set of open standards-based sensory, measurement, metering, monitoring, recording, and control functions; transmission and distribution automation, metering, and control protocols; secure digital and system designs that support a broad range of embedded computing, on-board memory and storage models; and advanced networking, routing, switching, policy, and security functions.

In various embodiments a policy-based residential networked meter can be an energy switch router device (ESRD) that provides policy-based advanced metering, load control and shaping, energy services delivery and accounting, and secure web services interfaces and internetworking communications. The ESRD can be integrated and inter-related with advanced policy-based sensory, metrology, monitoring, control, recording, classification, prioritization, security, routing, and switching functions. The ESRD may be used to sense, measure, meter, and control electrical service flows to the utility service point at the customer premise, and may be configured and managed with one or more policy-based networking methods.

In some embodiments, a policy-based residential networked meter can provide support for advanced power sensing, metrology, monitoring, metering, control, recording, and reporting functions. The networked meter may provide a logic fabric for both real-time and near real-time policy enforcement and control of electric power service flows, events, services, messages, or the like. In addition, the policy-based residential networked meter may provide support for secure internetworking communications across wide area, metropolitan area, local area, and home area networks. In further embodiments, the policy-based residential networked meter can be used to deliver voice, video and data broadband services. The policy-based residential networked meter may provide support for policy-based managed service activation, provisioning, configuration, monitoring, management and control, and may enable support for policy-based managed service authentication, authorization, accounting, reporting, control, and accounting, both of which embodiments are configured and managed via web interfaces.

In further embodiments, a policy-based residential networked meter can provide the integration and interrelation of disparate methods, techniques, models, and algorithms in the independent fields of electric power transmission and distribution automation, utility sensory measurement and recording, electricity service quality monitoring and control, electric power load control and shaping, dynamic tariff/rate structured metering and accounting, web configuration and energy services interfaces, and secure policy-based internetworking communications into a single device.

In various embodiments, a policy managed and controlled energy switch router device (ESRD) can interact with and participate in a highly distributed and centrally managed policy control plane that may be used to provision, configure, monitor, manage, and control an intelligent electric grid network. An ESRD may be used to provide internetworking services, and secure network connection activation, authentication, authorization, and accounting functions for interfacing a policy-based intelligent electric grid network to foreign wide area, metropolitan area, local area, and home area networks.

Another embodiment of the present invention can also be used to provide policy-based advanced utility distribution network automation and secure internetworking functions that enable an intelligent electric grid network that is predictive, self-adaptive, self-optimizing, fault-sensing, self-healing, and secure.

Another embodiment of the present invention can also be used to provide policy-based advanced utility transmission network automation and secure internetworking functions that enable an intelligent electric grid network that is predictive, self-adaptive, self-optimizing, fault-sensing, self-healing, and secure.

Another embodiment of the present invention can also be used to provide policy-based advanced utility generation automation and secure internetworking functions that enable an intelligent electric grid network that is predictive, self-adaptive, self-optimizing, fault-sensing, self-healing, and secure.

Another embodiment of the present invention can also be used to provide policy-based advanced micro generation automation and secure internetworking communications functions. In some embodiments, an ESRD can be used to provide internetworking services, and secure network connection activation, authentication, authorization, and accounting functions for interfacing to a policy-based intelligent electric grid network, or to foreign wide area, metropolitan area, local area, and home area networks.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

In general, tomorrow's intelligent electric grid network infrastructure will include energy switch router devices located throughout the transmission and distribution circuits, and at the edge of the service distribution network. In various embodiments, the residential policy-based meter device embodiment of the present invention provides more features than traditional measuring, metering, recording, and automated reading. Specifically, the embodiment serves as an essential internetworked, intelligent, sensor, meter, recorder, controller, policy enforcer, and service delivery platform device that is coupled to a predictive, self-adaptive, self-optimizing, fault-sensing, self-healing, and secure intelligent electric grid infrastructure.

Figure 1:
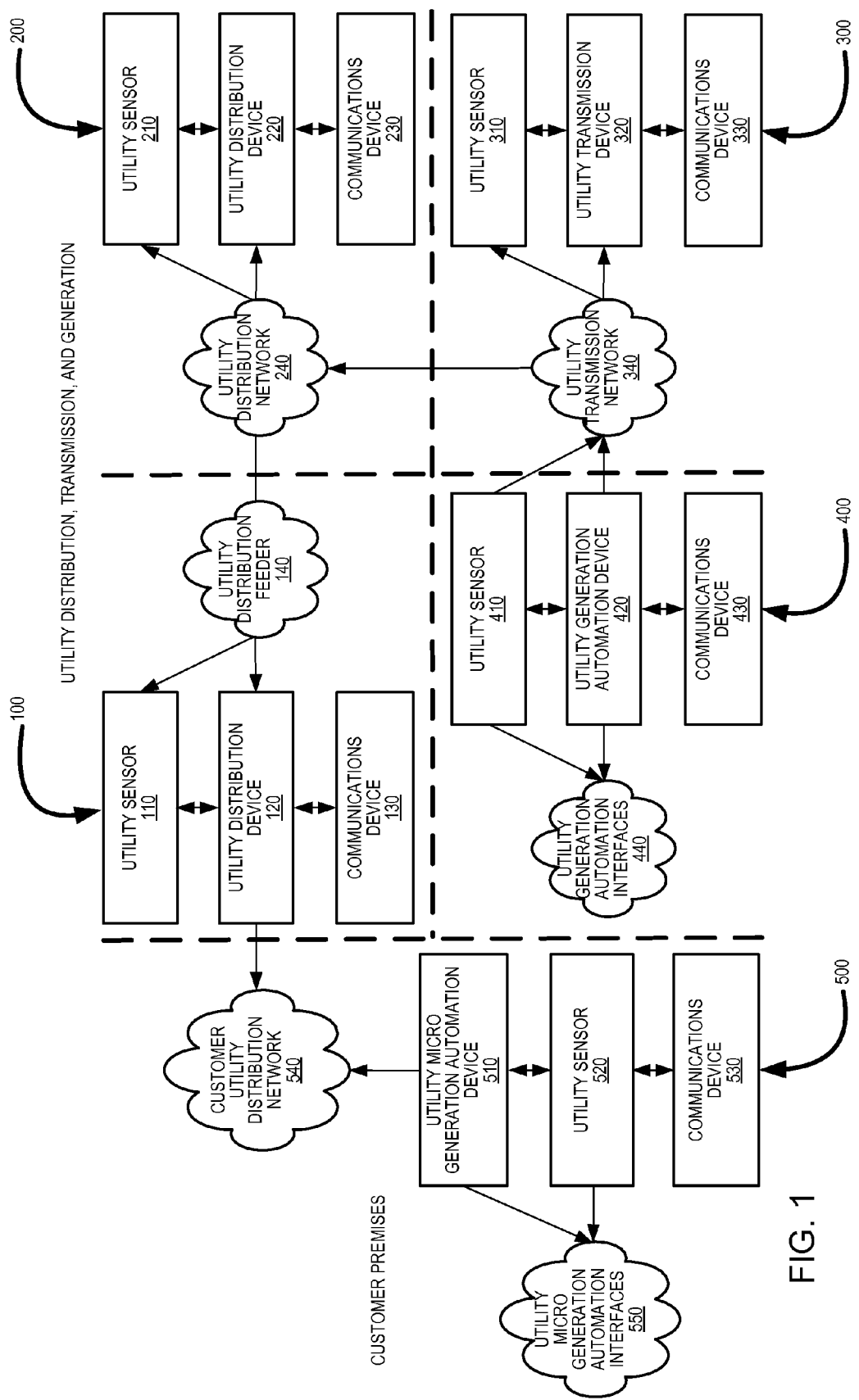
FIG. 1 is a block diagram illustrating five systems integrating utility distribution network automation and management, utility transmission network automation and management, utility generation automation and management, and utility micro distribution automation and management in five separate embodiments according to the present invention.

FIG. 1 is a block diagram illustrating systems 100 and 200, integrating utility distribution and utility distribution automation, system 300 integrating utility transmission and utility transmission automation, system 400 integrating utility generation automation, and system 500 utility micro generation automation, in five embodiments according to the present invention. In this example, system 100 includes utility sensor 110, utility distribution device 120, and communications device 130. One or both of utility sensor 110 and utility distribution device 120 are coupled to utility distribution network feeder 140. Utility distribution device 120 is coupled to customer utility distribution network 540 located at a customer's premises (indicate by a dashed line separating network 140 from distribution 540).

Further, in this example, system 200 includes utility sensor 210, utility distribution device 220, and communications device 230. One or both of utility sensor 210 and utility distribution device 220 are coupled to utility distribution network 240. Further, in this example, system 300 includes utility sensor 310, utility transmission device 320, and communications device 330. One or both of utility sensor 310 and utility transmission device 320 are coupled to utility transmission network 340. Further, in this example, system 400 includes utility sensor 410, utility generation automation device 420, and communications device 430. One or both of utility sensor 410 and utility generation automation device 420 are coupled to utility generation automation interfaces 440 and utility transmission network 340. Lastly, in this example, system 500 includes utility micro generation automation device 510, utility sensor 520, and communications device 530. One or both of utility micro generation automation device 510 and utility sensor 520 are coupled to customer utility distribution network 540 and utility micro generation automation interfaces 550.

In general, utility sensor 110 can include hardware and/or software elements configured to sense utilities provided through utility distribution feeder 140 to the customer's premises via utility distribution device 120. For example, various embodiments may sense real-time energy loads, power quality levels, line fault conditions, and the like.

Utility distribution device 120 can include any device associated with distribution of a utility, such as power meters, gas meters, water meters, switches, values, regulators, converters, transformers, and the like. Some examples of utility distribution feeder 140 include a power grid, including distribution lines and associated support devices, a municipal water system, gas/propane distribution network, and the like. Some examples of customer utility distribution network 540 may include household electrical wiring, smart-home distribution of cable TV, satellite, telephone, gas, water, sewer, and the like, apartment or condo complex distribution, commercial building power/water/gas facilities, and the like.

In some embodiments, utility sensor 110, utility distribution device 120, and communications device 130 can provide real-time and near real-time sensing, measurement, monitoring, recording, analytics, classification, decision processing, and event and message switching/routing to support dynamic load shaping, improved power quality, fault isolation and restoration, demand response, and the like. Accordingly, some embodiments of the present invention may provide integration of disparate technologies such as utility metrology, fault isolation and grid healing, and internetworking communications, via a logic fabric, into a single device that provides interrelated functional support for sensing, measurement, monitoring, recording, analysis, classification, decision processing, event and message generation, policy enforcement, and internetworking switching and/or routing services. Further, some embodiments of the present invention are an integrated digital device with advanced electric power sensing, measurement, monitoring, recording, analysis, decision processing, classification, event and message generation, policy enforcement, network addressing, internetworking switching and/or routing services, network addressing and security services (e.g., host configuration, firewall, intrusion detection, virtual private networking).

In one example of operation, utility sensor 110 and utility distribution device 120 provide one or more fault management operations. For example, some embodiments may include hardware and/or software elements configured to diagnose faults, generate corrective configurations, and provide alarm and event handling. In another example, some embodiments include hardware and/or software elements configured to generate and maintain event and history logs. In yet another example, some embodiments may include hardware and/or software elements configured to provide policy and internetworking state management.

In another example of operation, utility sensor 110, utility distribution device 120, and communications device 130 may manage the collection, recording, and reporting of communications statistics. In another example, an embodiment manages the collection, recording, and reporting of utility service statistics. An embodiment may further create and maintain automated and on-demand reports associated with its operation and distribution of one or more utilities.

In some embodiments, utility sensor 110, utility distribution device 120, and communications device 130 provide various security features and management. For example, an embodiment may incorporate device identity digital credentials, application level passwords, and network connection cryptographic key management.

In various embodiments, utility sensor 110, utility distribution device 120, and communications device 130 provide policy-based internetworking communications to other devices coupled to customer utility distribution network 540. For example, in one embodiment, the occurrence of a maximum demand load threshold event may be communicated during a critical peak event to one or more devices on the customer utility distribution network 540, utility distribution network 240, and/or utility transmission network 340. In another example, load, power quality levels, and fault conditions may be communicated to devices on the customer utility distribution network 540, utility distribution network 240, and/or utility transmission network 340.

In various embodiments, utility sensor 110, utility distribution device 120, and communications device 130 may provide configuration management of dynamic tariff/rate structured metering and accounting, and secure policy-based internetworking communications. For example, one or more metrology functions may be configured. In another example, one or more utility network communications functions may be configured. In yet another example, activation, provisioning, configuration, management, and accounting of voice, video, and data broadband services may be provided and/or enabled to the customer utility distribution network 540. In a further example, management and distribution services for software and firmware may be provided and/or provisioned.

Figure 2:
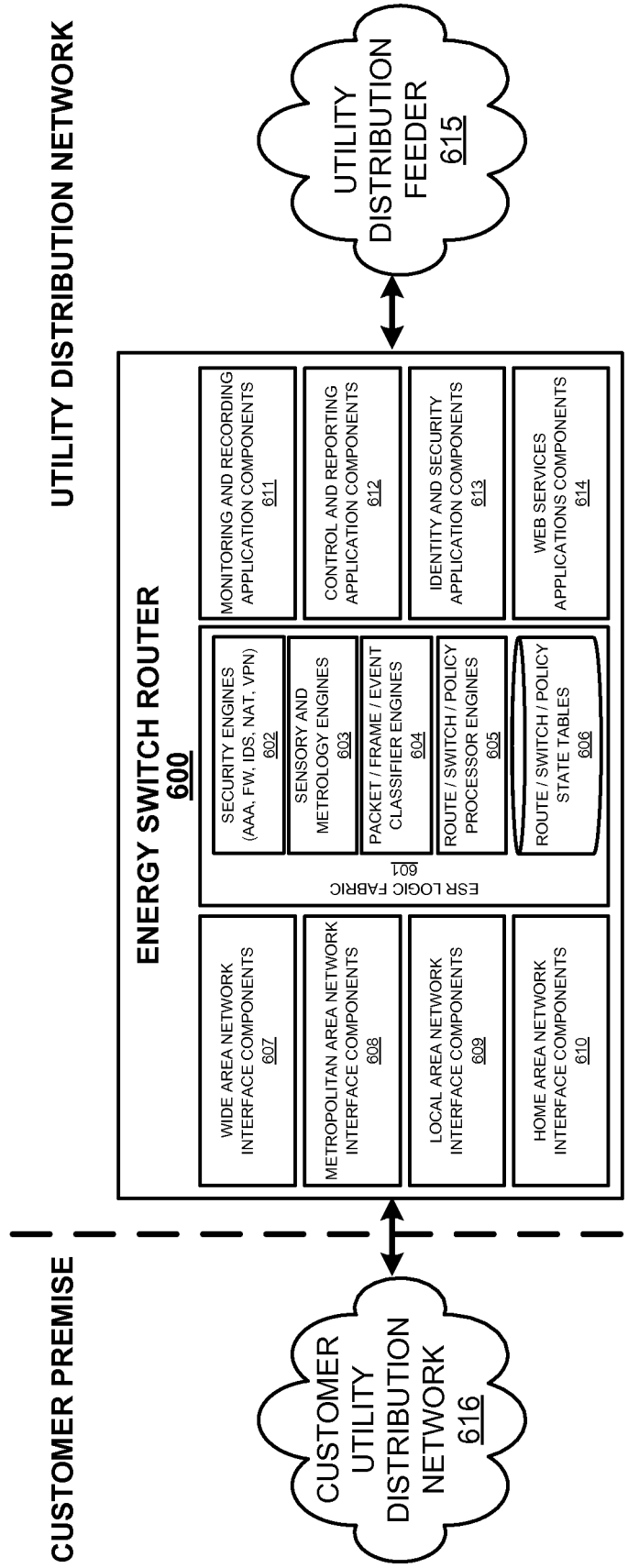
FIG. 2 is a block diagram illustrating an energy switch router, in one embodiment of the present invention, at the service delivery edge of the utility distribution network that is connected to the customer utility distribution network.

FIG. 2 is a block diagram illustrating an energy switch router (ESR) device 600 used in utility distribution and utility management in one embodiment according to the present invention. ESR 600 includes: ESR logic fabric 601, security engines 602, sensory and metrology engines 603, packet/frame/event classifier engines 604, route/switch/policy processor engines 605, and route/switch/policy state tables 606. ESR 600 may include wide area network interface components 607, metropolitan area network interface components 608, local area network interface components 609, home area network interface components 610, monitoring and recording application components 611, control and reporting application components 612, identity and security application components 613, and web services applications components 614. Further, ESR 600 can be connected to utility distribution feeder 615 and customer utility distribution network 616.

ESR logic fabric 601 includes: security engines 602, sensory and metrology engines 603, packet/frame/event classifier engines 604, route/switch/policy processor engines 605, and route/switch/policy state tables 606.

Sensory and metrology engines 603 can include any hardware and/or software elements that perform metrology functions, such as sensing, measurement, monitoring, recording, analytics, classification, decision processing, and event and message switching/routing to support dynamic load shaping, improved power quality, fault isolation and restoration, demand response, and the like. Some examples of sensory and metrology engines 603 include American National Standards Institute (ANSI) C12.18/C12.19 energy meters, International Electrotechnical Commission (IEC) 62056 meters, distributed networking protocol (DNP) meters, smart meters, and the like.

Wide area network (WAN) interface components 607 can include any hardware and/or software elements configured to exchange voice, video, or data over a wide area network. Some examples of WAN interface 220 include broadband interfaces, an Institute of Electrical and Electronics Engineers (IEEE) 802.11 interface (or WiFi interface), IEEE 802.16 interface (or WiMAX interface), 3GPP LTE interface, cable modems (or DOCSIS), digital subscriber lines (xDSL), fiber-to-the-home (FTTH), leased lines (e.g., T1 or OC3), cellular phone modems, the public telephone system (POTS), and the like. Some examples of communications networks include the Internet, a metropolitan network (MAN), a local area network (LAN), a public network, a corporate private network, and the like.

Home area network (HAN) interface 610 can include any hardware and/or software elements configured to exchange voice, video, or data over a home area network. Some examples of HAN interface 610 include modems, IEEE 802.1.Q interfaces (or VLANs), IEEE 802.3 interfaces (or Ethernet), Homeplug Powerline Alliance interfaces (or Homeplug), ZigBee Alliance interfaces (or ZigBee), ASHRE interfaces (or BACnet), asynchronous transfer mode (ATM) interfaces, fiber optic interfaces (or DWDM), and the like. Some examples of communications networks include single point-to-point links, point-to-multi-point links, customer premises HANs, corporate LANS, and the like.

In one example of operation, ESR 600 can provide integration of real-time and near real-time sensing, measurement, monitoring, recording, analytics, classification, decision processing, and event and message switching/routing to support dynamic load shaping, improved power quality, fault isolation and restoration, demand response, and the like, into a single device, via a logic fabric, that provides interrelated functional support for energy measuring, monitoring, metering, analysis, decision processing, message generation, and internetwork-level switching and/or routing services. In various embodiments, these functions are extensibly provided using a policy-based configuration, analytics, and control mechanism.

Figure 3:
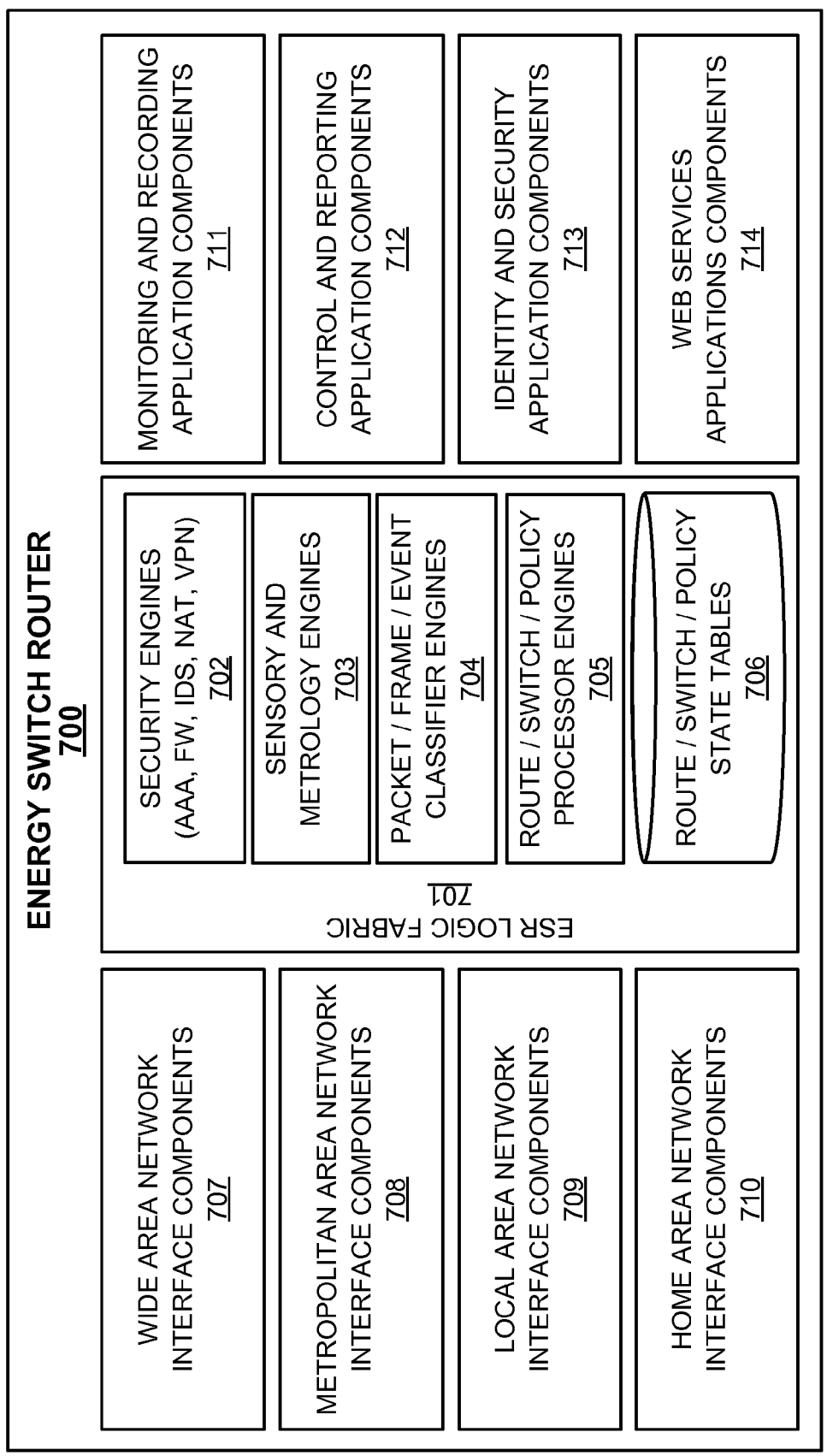
FIG. 3 is a block diagram illustrating the main functional elements of the energy switch router in one embodiment according to the present invention.

FIG. 3 is a block diagram illustrating an energy switch router (ESR) device 700 used in utility distribution and utility management in one embodiment according to the present invention. ESR 700 includes: ESR logic fabric 701, security engines 702, sensory and metrology engines 703, packet/frame/event classifier engines 704, route/switch/policy processor engines 705, route/switch/policy state tables 706, wide area network interface components 707, metropolitan area network interface components 708, local area network interface components 709, home area network interface components 710, monitoring and recording application components 711, control and reporting application components 712, identity and security application components 713, and web services applications components 714. In various embodiments, the engines and components of ESR 700 may be extensibly provided using a policy-based configuration, analytics, and control mechanism.

ESR logic fabric 701 can be any hardware and/or software elements configured to implement a policy. In general, a policy is a set of defined rules, conditions, and actions. Each rule is associated with one or more conditions and one or more actions. Typically, the one or more conditions must be satisfied for the one or more actions to be performed. Some examples of conditions are number values, time values, date values, and the like. Some examples of actions are collect data, retrieve data, store data, generate messages, generate reports, operate one or more metrology functions, operate one or more load control functions, and the like.

A policy may be implemented in conjunction with utility industry end device tables (e.g., ANSI C12.19) or utility meter objects (e.g., IEC 62056). These tables and/or objects may define configuration values associated with a meter, results of metrology functions, and the like. Some examples of end device tables/objects are configuration tables/objects, data source tables/objects, register tables/objects, local display tables/objects, security tables/objects, time-of-use tables/objects, load profile tables/objects, history and event logs, load control and pricing tables/objects, manufacture tables/objects, and the like.

In various embodiments, sensory and metrology engines 703, packet/frame/event classification engines 704, monitoring and recording application components 711, and control and reporting application components 712 may detect outages, failures, disruptions, and restoration in utility distribution. Further, an embodiment of these engines and components may take actions in the event of a detected outage, failure, disruption, and restoration, such as generating notifications, opening/closing switches, generating reports, and the like.

In some embodimenst, sensory and metrology engines 703, packet/frame/event classification engines 704, monitoring and recording application components 711, and control and reporting application components 712 may implement one or more utility tariff/rate programs that are to be associated with a utility service. For example, a specific utility tariff/rate program may be implemented to sense, measure, meter, record, and report one or more utility service tiers or levels of service.

In further embodiments, sensory and metrology engines 703, packet/frame/event classification engines 704, route/switch/policy state tables 706, and monitoring and recording application components 711 may define the conditions that establish base-line physical and logical operation of a meter indicative of a healthy meter. Further, an embodiment of these engines and components may define actions to be performed when conditions associated with meter fail to satisfy the definition of a healthy meter.

In yet another embodiment, security engines 702 and identity and security application components 713 may define who has access to data, and what policies are to be enforced in the event of an intrusion or unauthorized attempt to access data.

In yet another embodiment, control and reporting application components 712 and route/switch/policy processor engines 705 may define how much of a utility may be distributed, and at what rate it is distributed.

In yet another embodiment, sensory and metrology engines 703, monitoring and recording application components 711, and control and reporting application components 712 may control which data is obtained to provide a daily tracking of utility usage, quality, and the like. Further, an embodiment of these engines and components may define actions to be performed that report the results of metrology functions. Further, an embodiment of these engines and components may define conditions for pre-paid energy delivery service, and may enable/disable service delivery according to account status.

In various embodiments, packet/frame/event classifier engines 704, route/switch/policy processor engines 705, and route/switch/policy state tables 706 define conditions for and provide priority internetworking communications to ESR 700.

In some embodiments, sensory and metrology engines 703, monitoring and recording application components 711, and control and reporting application components 712 may control power quality monitoring and reporting, and define limits or thresholds establishing the quality of energy distribution, and enforce the policies to be applied when the quality or condition of energy distribution fails to satisfy the conditions. An embodiment of these engines and components may define conditions in which demand is slowing or increasing such that appropriate actions are taken.

In further embodiments, security engines 702 and identity and security application components 713 may enforce security policies for ESR 700. In one example, a security policy defines one or more conditions associated with security of ESR 700. When the one or more conditions associated with the security of ESR 700 are met or satisfied, one or more actions defined by the security policy are performed. For example, the security policy may define a set of network addresses, ports and interfaces from which ESR 700 is allowed to be accessed. When ESR 700 receives a request or packet from the set of network addresses, ports and interfaces from which it is allowed to be access, the one or more actions defined by the security policy may be performed to allow the request or packet from the set of network addresses, ports and interfaces.

In yet another embodiment, sensory and metrology engines 703, monitoring and recording application components 711, and control and reporting application components 712 may enforce metrology policies on ESR 700. When the one or more rules or conditions associated with metrology functions of ESR 700 are met or satisfied, one or more actions defined by the metrology policy are performed. For example, metrology policy may configure a utility device, such as an energy meter to record energy usage, store energy usage in a particular format, and send alerts and signals when an energy usage exceeds a specific minimum or maximum threshold.

In one or more embodiments, sensory and metrology engines 703, monitoring and recording application components 711, and control and reporting application components 712 may enforce a consumption policy that defines one or more rules or conditions associated with consumption of utilities associated with ESR 700. When the one or more rules and/or conditions associated with the consumption policy are met or satisfied, one or more actions defined by the consumption policy are performed. For example, the consumption policy may define tiers for consumption, and rates associated with the predetermined tiers of consumption. The consumption policy may further define time intervals associated with usage of a particular utility. If a predetermined tier of consumption is exceeded, the consumption policy may define an action that throttles or disables utilities associated with ESR 700. In another example, the consumption policy may define an action that configures or disables consumer appliances (such as electric hot water heaters, air conditioners, or washer/dryers) during periods of usage, such as during energy emergencies.

In yet another embodiment, control and reporting application components 712 may enforce a reporting policy that defines one or more rules or conditions associated with how data is to be reported from ESR 700. When the one or more rules and/or conditions associated with how data is reported from ESR 700 are met or satisfied, one or more actions defined by the reporting policy are performed. For example, the reporting policy may define conditions for when and how data, such as utility consumption and utility quality, are reported to a utility organization. When the predefined conditions are satisfied, messages including the data may be generated and queued/sent to the utility organization for collection.

In one embodiment, web services application components 714 can be used to deploy policies that are provisioned using the Common Open Policy Service (COPS) protocol. In general, COPS is part of the Internet protocol suite as defined by the IETF's RFC 2748. COPS specifies a simple client/server model for supporting policy provisioning and enforcement. COPS policies are typically stored on policy servers, known as Policy Decision Points (PDP), and are enforced on distributed clients, also known as Policy Enforcement Points (PEP).

In general, there are two "flavors," or models of COPS: The Outsourcing Model and the Provisioning Model. The Outsourcing Model is the simplest flavor of COPS. In this model, all policies are stored at the PDP. Whenever the PEP needs to make a decision, it sends all relevant information to the PDP. The PDP analyzes the information, takes the decision, and relays it to the PEP. The PEP then simply enforces the decision. In the Provisioning Model, the PEP reports its decision-making capabilities to the PDP. The PDP then downloads relevant policies on to the PEP. The PEP can then make its own decisions based on these policies. The Provisioning Model can use the route/switch/policy processor engines 705 to enforce the policies, and the route/switch/policy state tables 706 as an in-memory repository of the policies.

In further examples of operation, ESR 700 provides integration and interrelation of utility sensory and measurement functions, service monitoring and recording functions, service control and policy enforcement functions, web-based configuration and service delivery interfaces, and secure communications into a single device.

Figure 4:
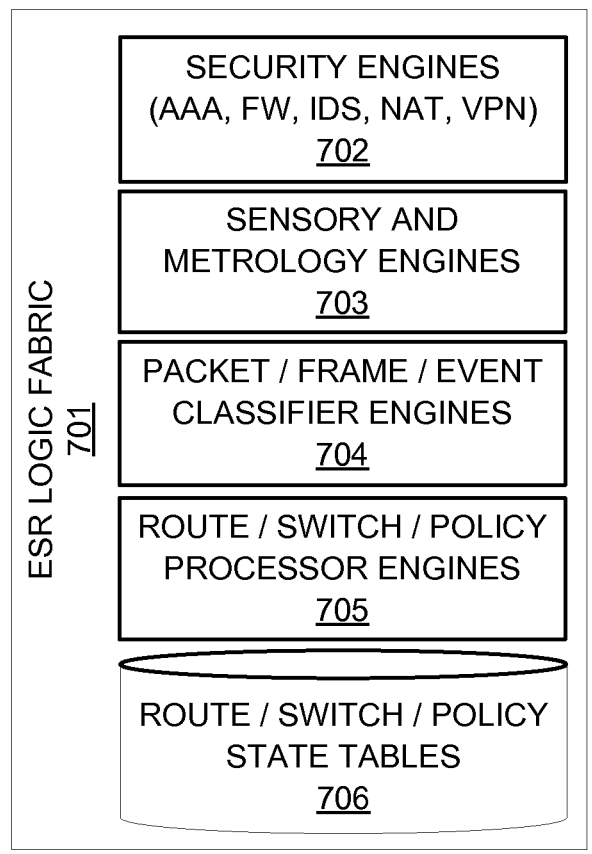
FIG. 4 is a block diagram illustrating the security, sensory, metrology, packet/frame/event classifier, route/switch/policy engines, and route/switch/policy state table components within the logic fabric of the energy switch router in one embodiment according to the present invention.

FIG. 4 is a block diagram illustrating security engines 702, sensory and metrology engines 703, packet/frame/event classifier engines 704, route/switch/policy processor engine 705, and route/switch/policy state tables 706, which are integrated and interrelated via ESR logic fabric 701, that may be employed by ESR 700 of FIG. 2 in one embodiment according to the present invention. In this example, security engines 702 includes authentication, authorization, and accounting (AAA) functions, firewall (FW), intrusion detection (IDS), network address translation (NAT), and virtual private network (VPN) services.

Security engines 702 can include firewall services (FW). FW can include hardware and/or software elements configured to regulate the flow of traffic between computer networks of different trust levels associated with ESR 700. Some examples of computer networks are the Internet, which may be a zone with no trust, and intelligent electric grid network 815 of FIG. 8A, which may be a zone of higher trust. FW may further provide a zone with an intermediate trust level, such as a "perimeter network" or Demilitarized zone (DMZ). In addition, FW may prevent network intrusion from a private network, such as customer utility distribution network 616 of FIG. 2.

Security engines 702 can include intrusions detection services (IDS). IDS can includes hardware and/or software elements configured to detect unwanted manipulations of ESR 700. In general, IDS may be used to detect several types of malicious behaviors that can compromise the security and trust of ESR 700. This may include network attacks against vulnerable services, data driven attacks on applications, host based attacks such as privilege escalation, unauthorized log-ins and access to sensitive files, and malware (viruses, trojan horses, and worms). In various embodiments, IDS can be composed of several components (not shown), such as sensors which generate security events, a console to monitor events and alerts and control the sensors, and a engine that records events logged by the sensors in a database and uses a system of policies to generate alerts from security events received.

Security engines 702 can include network address translation services (NAT). NAT can include hardware and/or software elements configured to translate portions of network traffic. In general, NAT, also known as Network Masquerading, Native Address Translation or IP Masquerading is a technique of re-writing the source and/or destination Internet Protocol (IP) addresses and usually also the Transmission Control Protocol/User Datagram Protocol (TCP/UDP) port numbers of IP packets as they pass through. In various embodiments, NAT enables multiple hosts on a private network to access the Internet using a single public IP address.

Security engines 702 can include virtual private network services (VPN). VPN can include hardware and/or software elements configured to provide internetworking communications securely tunneled between two or more devices. For example, VPN may secure communications and the transmission of data associated with ESR 700 through intelligent electric grid network 815 of FIG. 8A. VPN may include security features, such as authentication or content encryption.

In further examples of operation, ESR 700 may provide integration and interrelation of utility sensory and measurement functions, service monitoring and recording functions, service control and policy enforcement functions, web-based configuration and service delivery interfaces, and secure communications into a single device.

Figure 5:
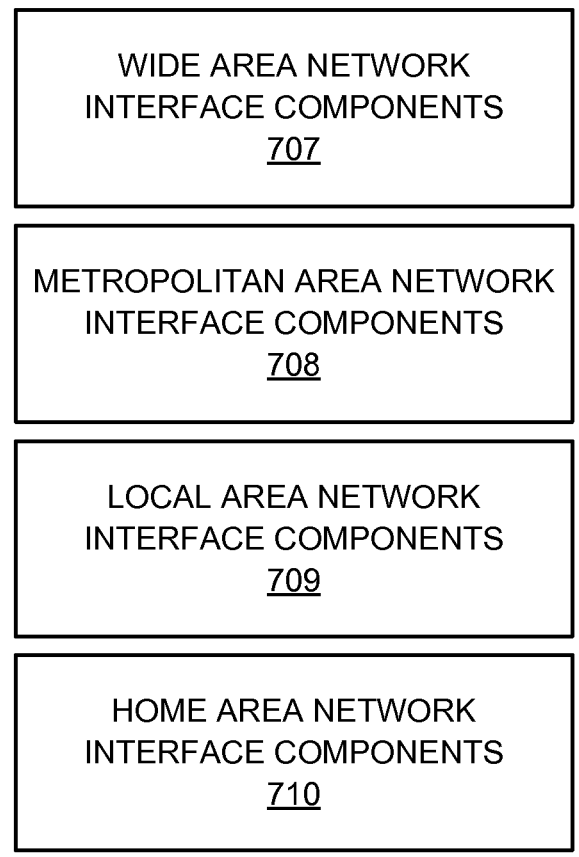
FIG. 5 is a block diagram illustrating the internetwork communications interface components of the energy switch router in one embodiment according to the present invention.

FIG. 5 is a block diagram illustrating integrated and interrelated wide area network 707, metropolitan area network 708, local area network 709, and home area network 710 interface components that may be employed by ESR 700 of FIG. 2 in one embodiment according to the present invention.

In various embodiments, wide area network interface component 707 can include hardware and/or software elements configured to provide secure wide area internetworking communications that may be employed by ESR 700. In some embodiments, metropolitan area network interface component 708 can include hardware and/or software elements configured to provide secure metropolitan area internetworking communications that may be employed by ESR 700.

In further embodiments, local area network interface component 709 can include hardware and/or software elements configured to provide secure local area internetworking communications that may be employed by ESR 700. In still further embodiments, home area network interface component 710 can include hardware and/or software elements configured to provide secure home area internetworking communications that may be employed by ESR 700.

Figure 6:
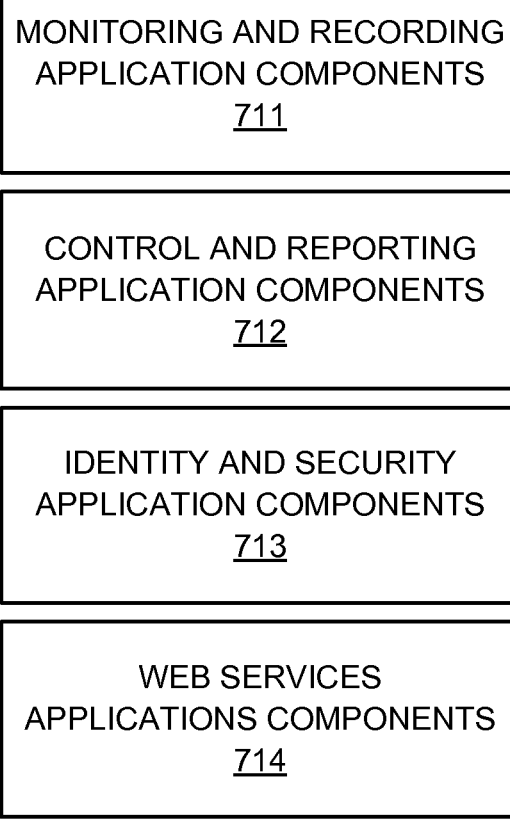
FIG. 6 is a block diagram illustrating various applications that may be employed by the energy switch router in one embodiment according to the present invention.

FIG. 6 is a block diagram illustrating integrated and interrelated monitoring and recording application components 711, control and reporting application components 712, identity and security application components 713, and web services applications and components 714 that may be employed by ESR 700 of FIG. 2 in one embodiment according to the present invention.

In some embodiments, monitoring and recording application components 711 can include hardware and/or software elements configured to provide utility monitoring and recording services that may be employed by ESR 700. Control and reporting application components 712 can include hardware and/or software elements configured to provide utility control and reporting services that may be employed by ESR 700.

In various embodiments, identity and security application components 713 can include hardware and/or software elements configured to provide utility control and reporting services that may be employed by ESR 700. Web services application components 714 can include hardware and/or software elements configured to provide web services interfaces that may be employed by ESR 700.

Figure 7A:
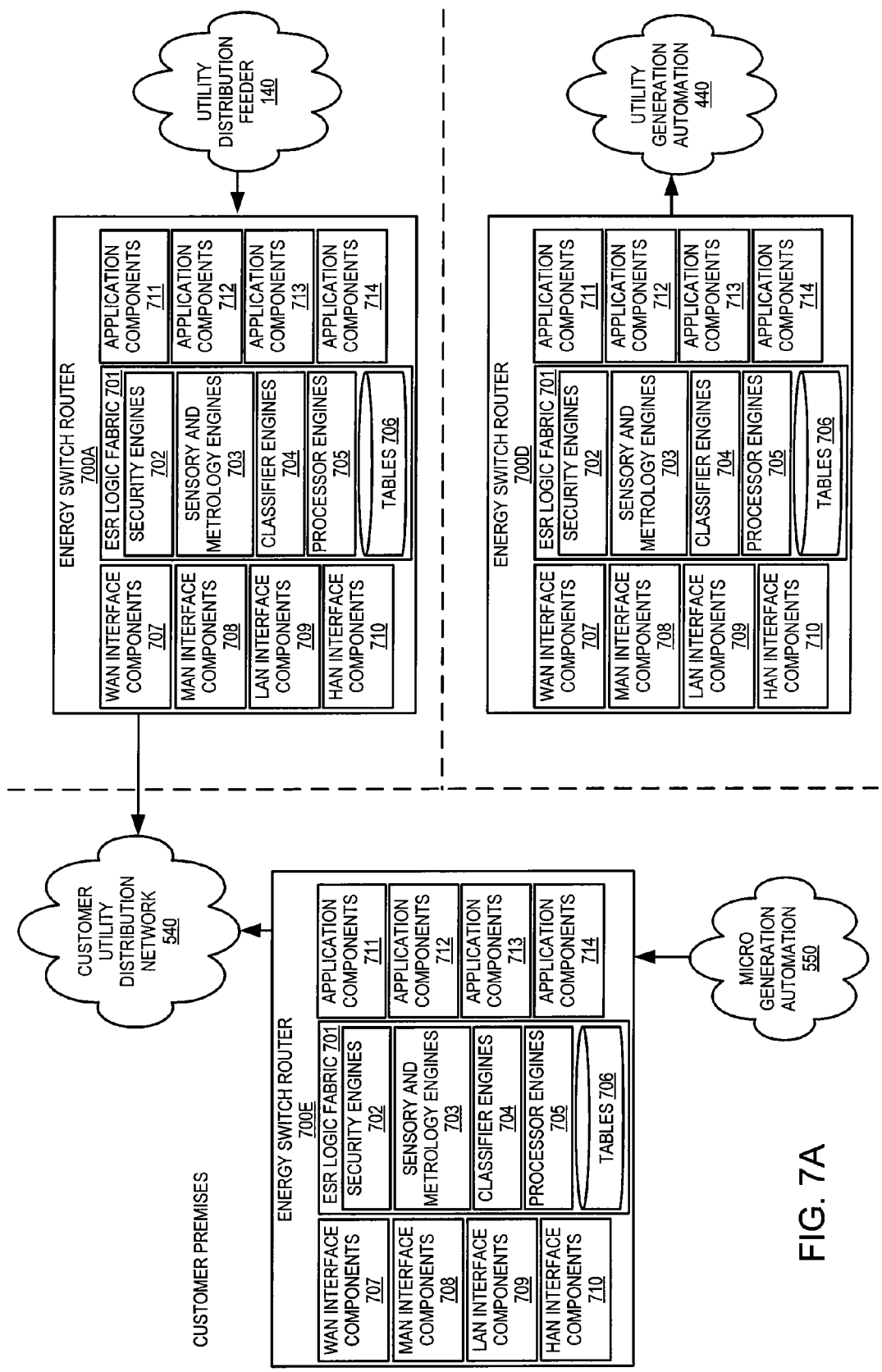
FIG. 7A and 7B are a block diagram illustrating five embodiments of an energy switch router, in five embodiments of the present invention, within the utility distribution network, utility transmission network, utility generation automation, and utility customer premises based micro utility generation automation locations.
Figure 7B:
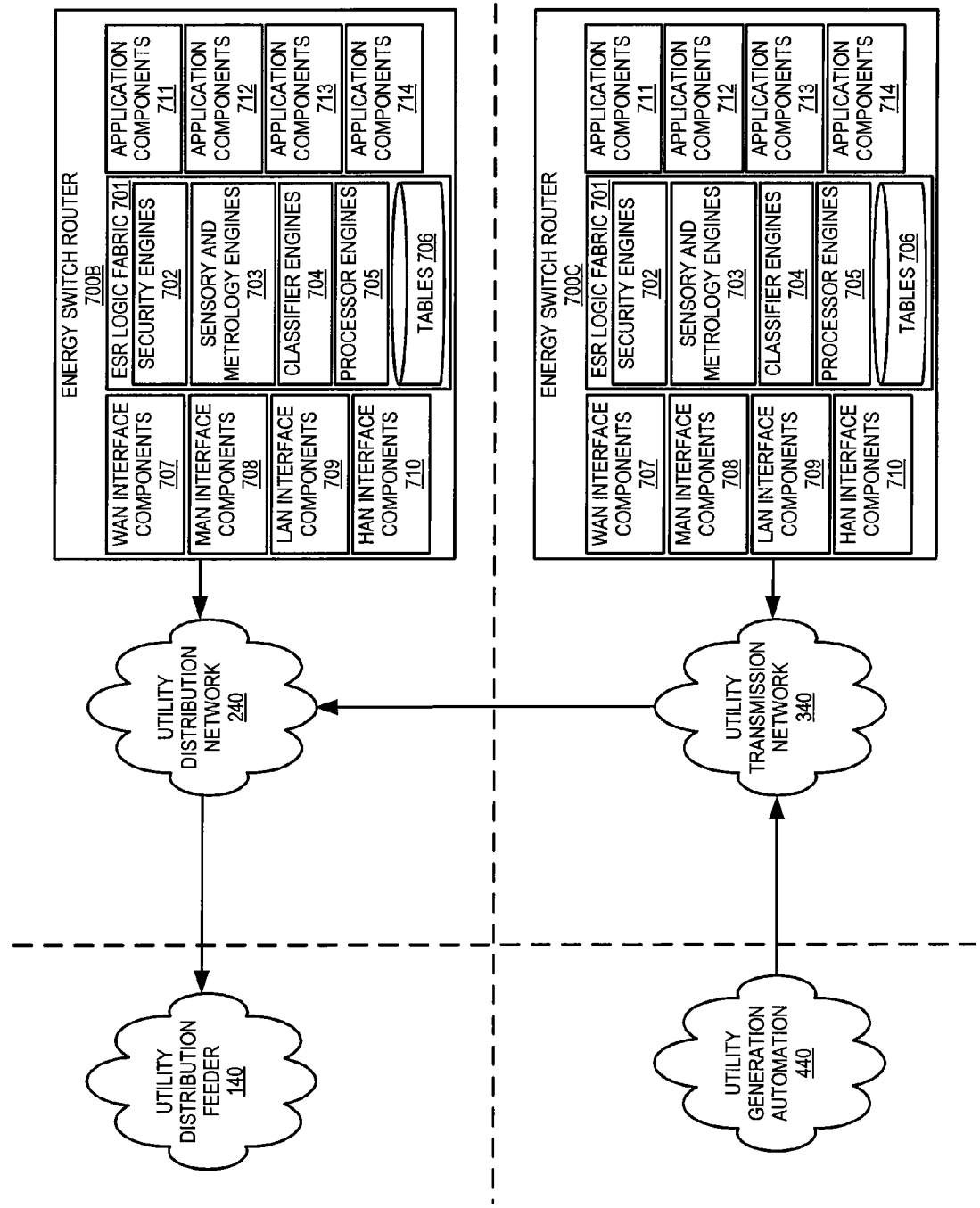

FIGS. 7A and 7B are a block diagram depicting ESR 700A, ESR 700B, ESR 700C, ESR 700D, and ESR 700E which can used to provide policy-based advanced utility generation automation and secure internetworking functions that enable an intelligent electric grid network that is predictive, self-adaptive, self-optimizing, fault-sensing, self-healing, and secure in one embodiment according to the present invention.

Figure 8A:
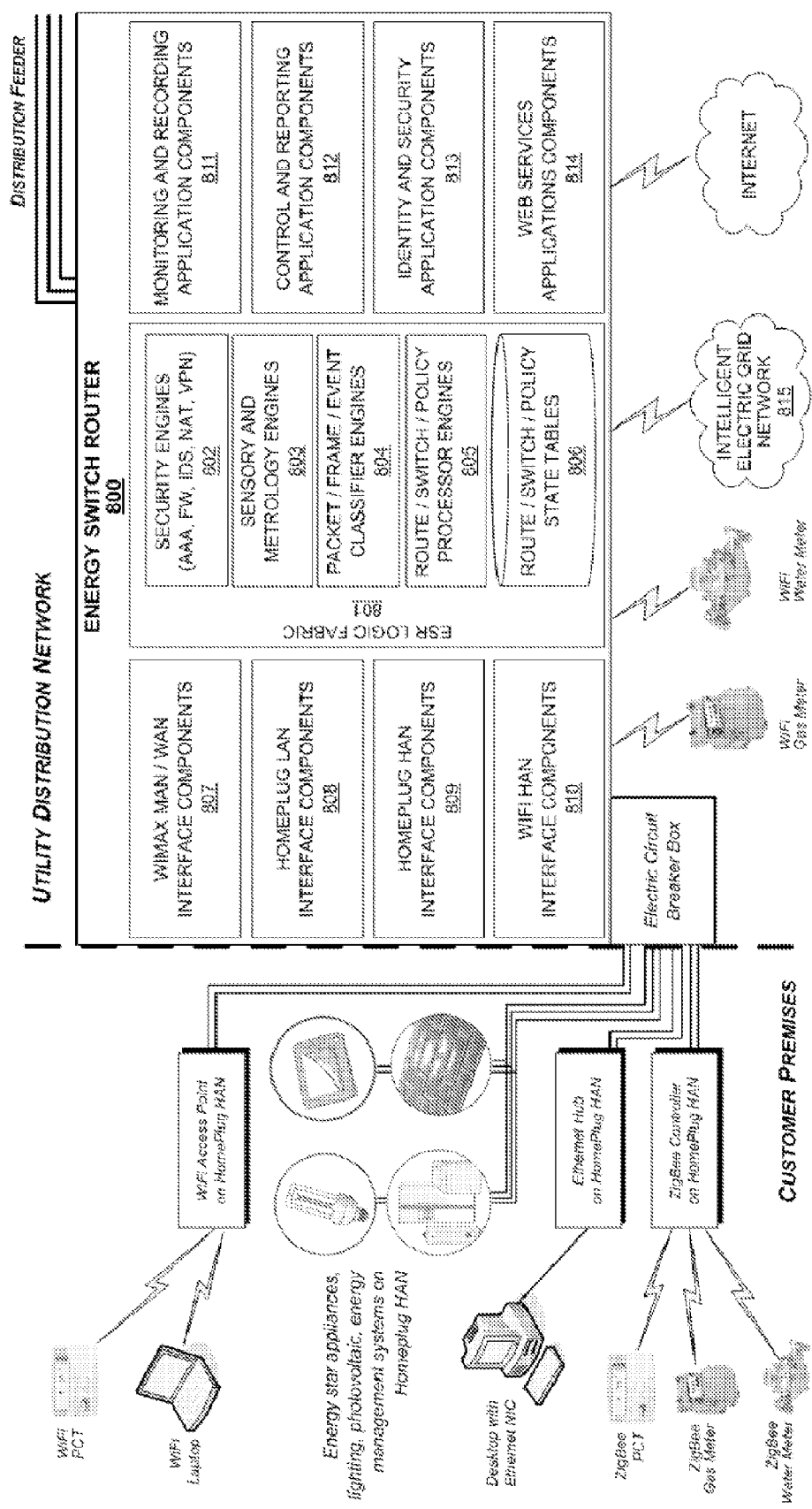
FIGS. 8A, 8B, and 8C are block diagrams illustrating the use of the energy switch router for electric power distribution sensory, metrology, tariff/rate structured metering and accounting, service delivery and quality control, service monitoring and reporting, load control and shaping, utility policy enforcement, utility web services delivery, and secure internetworking communications in one embodiment according to the present invention.
Figure 8B:
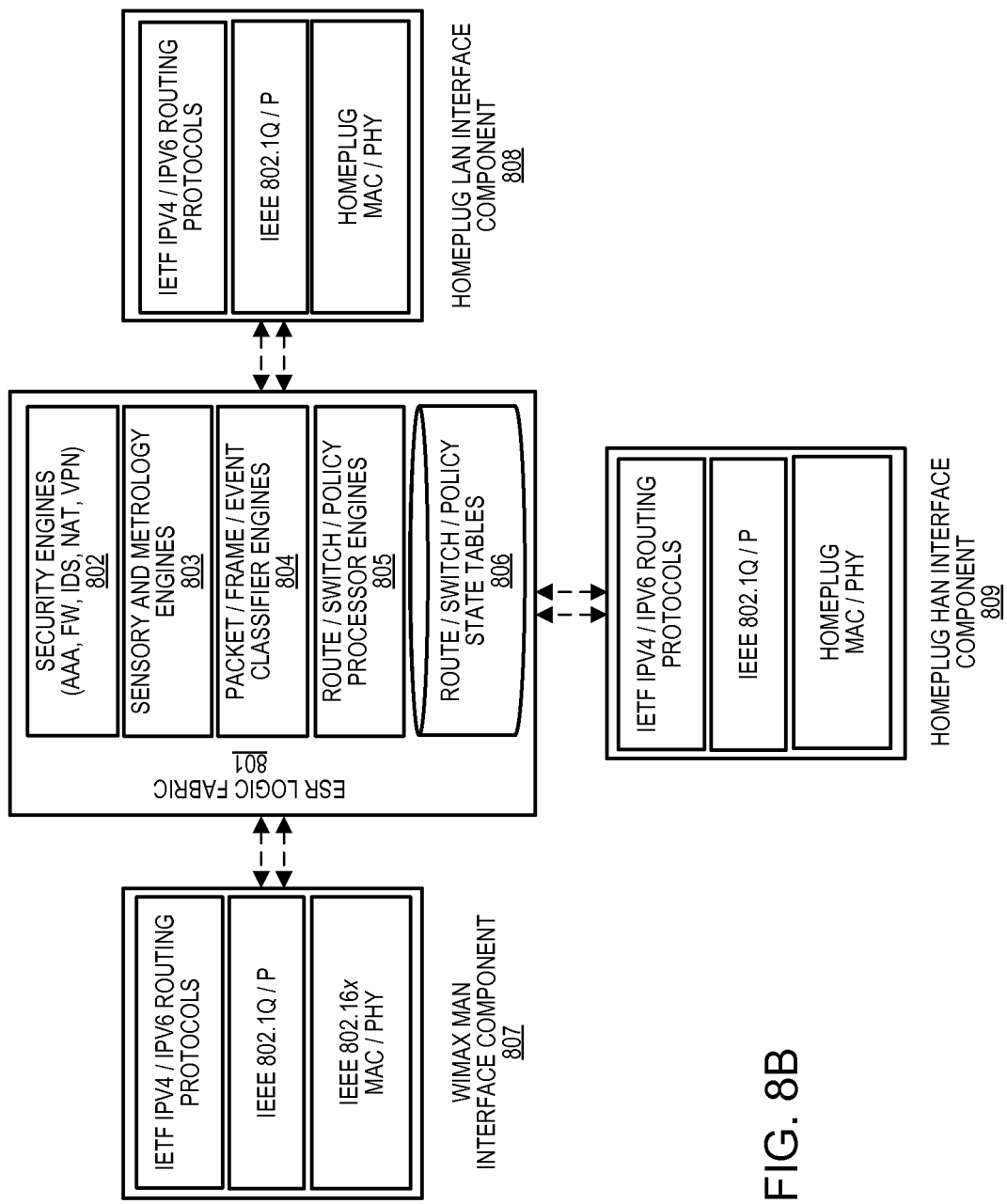
Figure 8C:
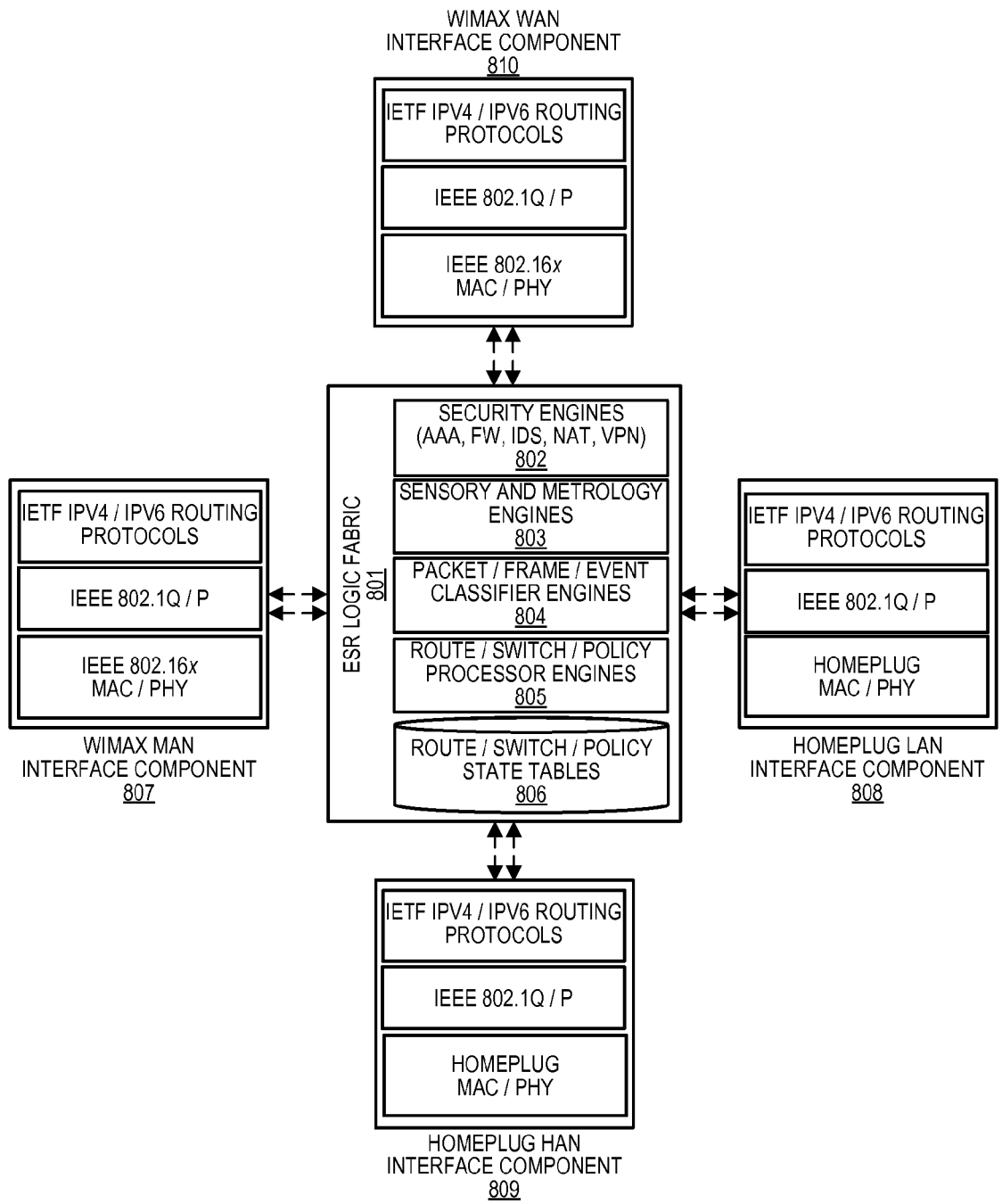

FIGS. 8A, 8B and 8C are block diagrams of ESR 800 that provides utility sensory and measurement functions, service monitoring, metering, and recording functions, service control and policy enforcement functions, web-based configuration and utility service delivery interfaces, and secure internetworking communications into a single device in one embodiment according to the present invention. At the heart of the ESR 800 is ESR logic fabric 801, which can include security engines 802, sensory and metrology engines 803, packet/frame/event classifier engines 804, route/switch/policy processor engines 805, and route/switch/policy state tables 806.

ERS 800 may also include WiMAX MAN/WAN components 807, Homeplug LAN components 808, Homeplug HAN components 809, and WiFi HAN components 810, monitoring and recording application components 811, control and reporting application components 812, identity and security application components 813, and web services application components 814, all of which can be integrated and interrelated with ESR logic fabric 801.

In this embodiment, ESR 800 receives electrical distribution from utility distribution feeder for sensory and measurement functions, service monitoring, metering, and recording functions, service control and policy enforcement functions, and distributes electricity to electric circuit breaker box located at a customer's premises. ESR 800 can be connected to intelligent electric grid network 815 (e.g., the Advanced Metering Infrastructure (AMI) network) and/or to the Internet through WiMAX MAN/WAN component 807 and/or through Homeplug LAN component 808.

In one example of operation, ESR 800 may configure, sense, measure, monitor, meter, record, and control electric power being distributed to the customer premises. ESR 800 may then route information associated with the above functions to/from intelligent electric grid network 815.

In another example of operation, ESR 800 may deliver voice, video and/or data broadband services between computer systems or devices located on the customer's premises and the Internet using WiMAX MAN/WAN component 807 and/or Homeplug HAN component 809.

In various embodiments, ESR 800 can be connected via WiFi component 810, or via a Homeplug to WiFi bridge, to one or more WiFi devices on the customer's premises (e.g., a WiFi programmable communicating thermostat [PCT], a WiFi Gas meter, a WiFi water meter, a WiFi laptop/desktop). ESR 800 may be connected via a Homeplug to ethernet bridge, to one or more ethernet devices (e.g., a desktop computer with an ethernet network interface card [NIC]). In addition, ESR 800 may further be connected via a Homeplug to ZigBee bridge to one or more ZigBee devices (e.g., a ZigBee PCT, a ZigBee gas meter, a ZigBee water meter). ESR 800 may act as an interface between these other utility devices, such as the gas meter or the water meter, and utility organizations responsible for the utility devices. ESR 800 may allow the devices coupled to the Homeplug network located at the customer's premises to access information associated with ESR 800 (e.g., such as utility usage) and to connect to the Internet.

Referring to FIGS. 8B and 8C, in some embodiments, ESR 800 may provide an intelligent routing/switching path between different communication networks associated with ESR 800. In these examples, ESR 800 can route/switch data between layers associated with WiMAX MAN components 807, Homeplug LAN components 808, Homeplug MAN components 809, and WiMAX WAN components 807.

Figure 9A:
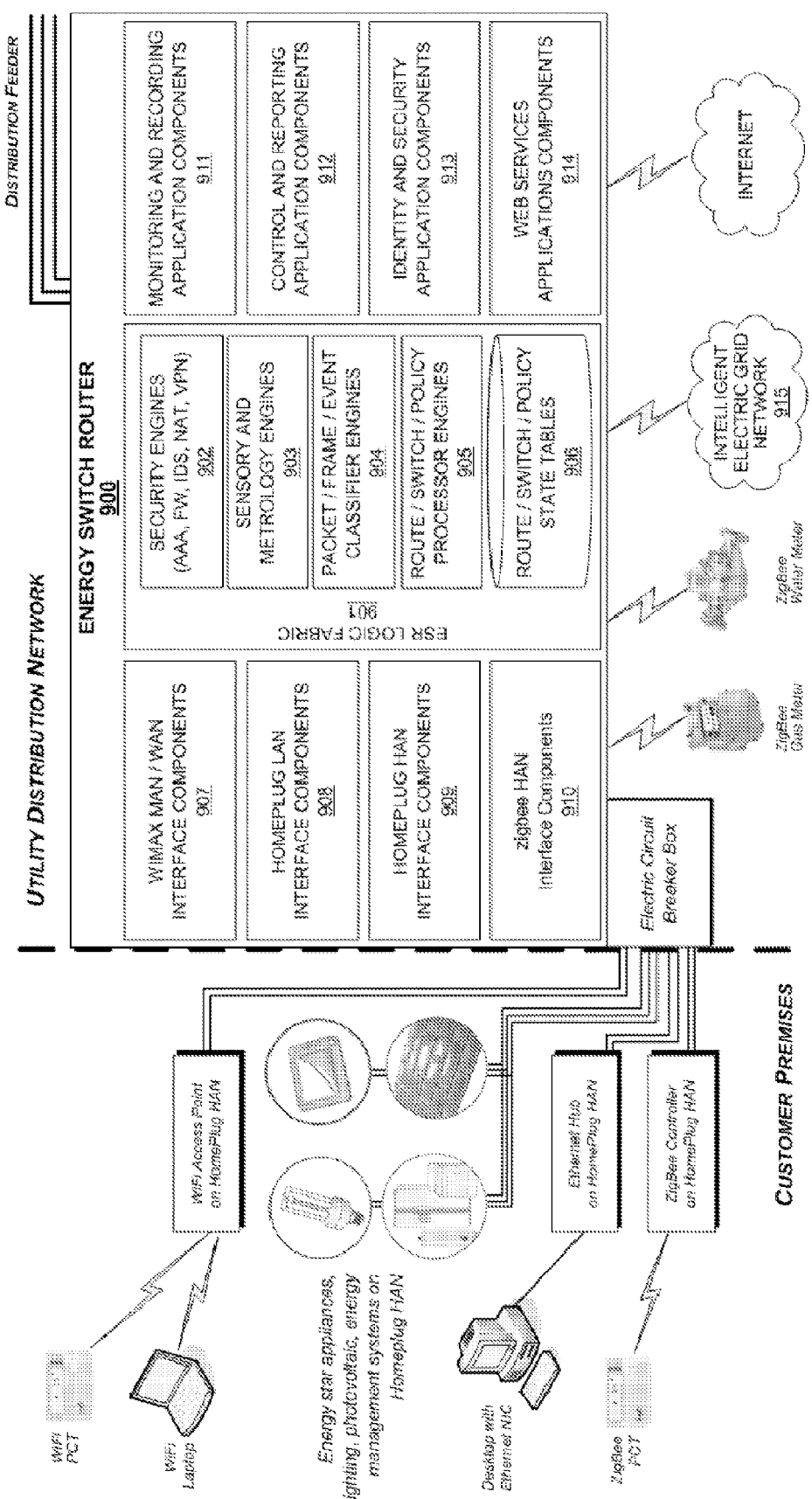
FIGS. 9A, 9B, and 9C are block diagrams illustrating the use of the energy switch router for electric power distribution sensory, metrology, tariff/rate structured metering and accounting, service delivery and quality control, service monitoring and reporting, load control and shaping, utility policy enforcement, utility web services delivery, and secure internetworking communications in one embodiment according to the present invention.
Figure 9B:
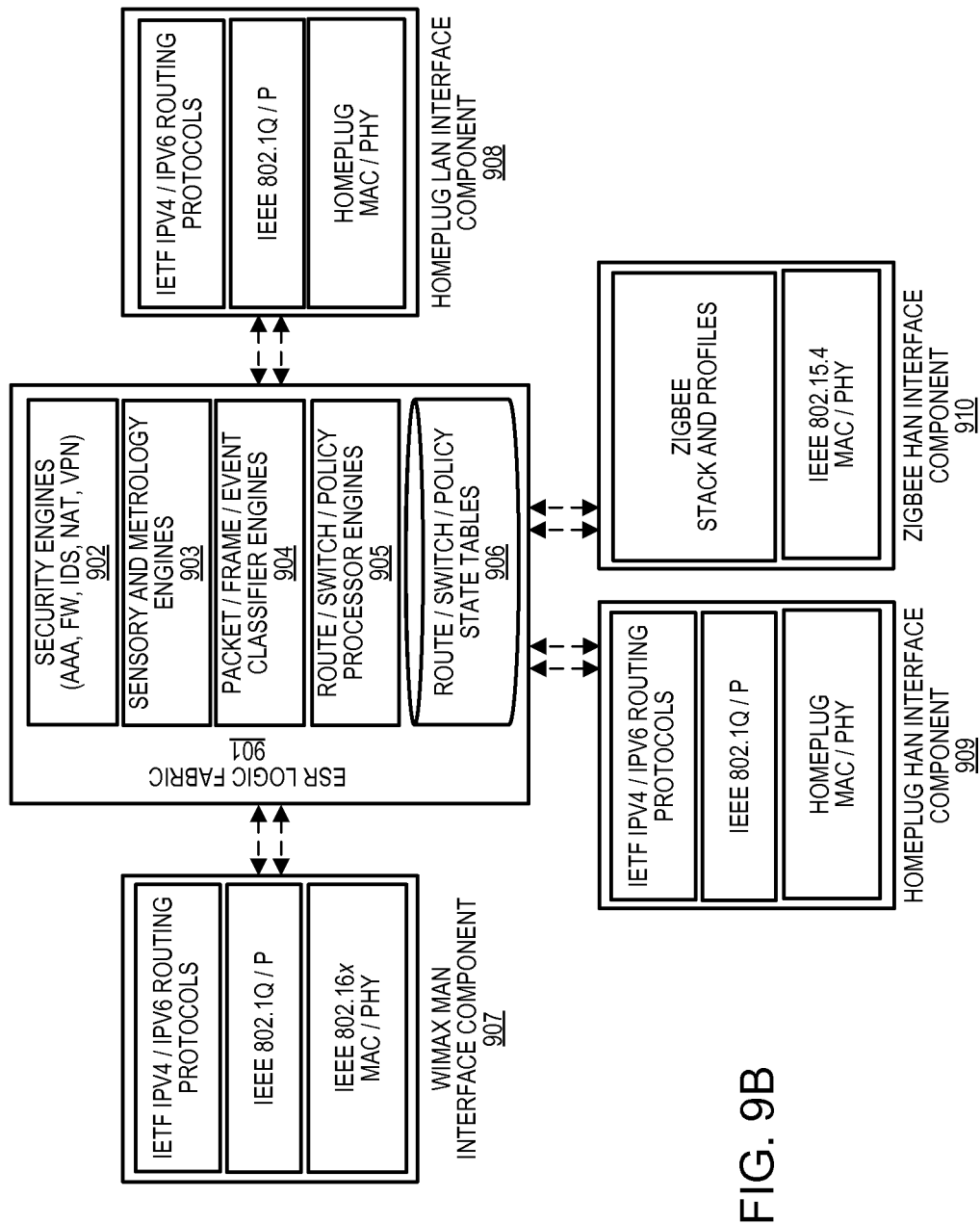
Figure 9C:
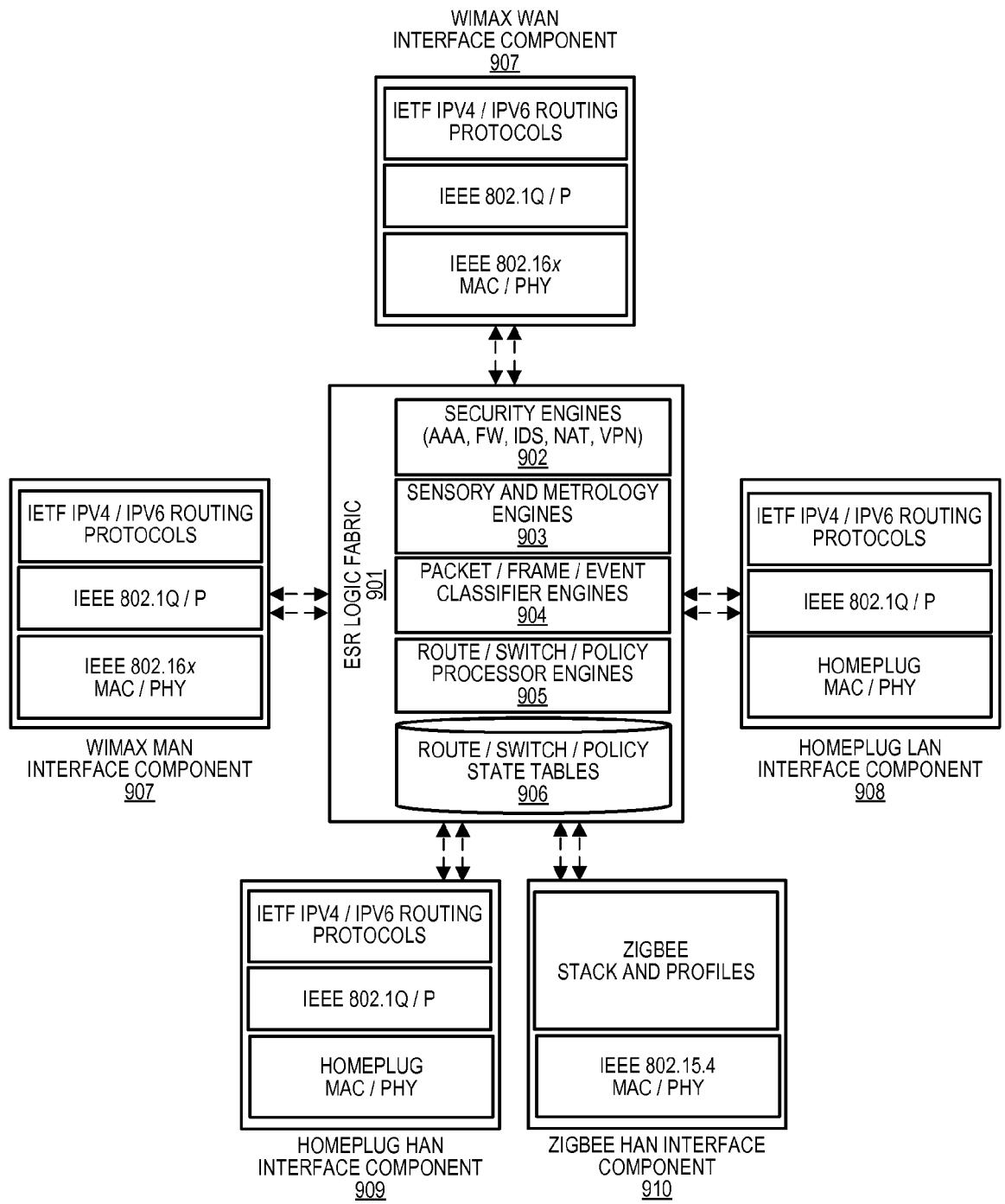

FIGS. 9A, 9B, and 9C are block diagrams of ESR 900 that provides utility sensory and measurement functions, service monitoring, metering, and recording functions, service control and policy enforcement functions, web-based configuration and utility service delivery interfaces, and secure internetworking communications into a single device in one embodiment according to the present invention. At the heart of the ESR 900 is the ESR logic fabric 901, which is comprised of security engines 902, sensory and metrology engines 903, packet/frame/event classifier engines 904, route/switch/policy processor engines 905, and route/switch/policy state tables 906.

ERS 900 may also include WiMAX MAN/WAN components 907, Homeplug LAN components 908, Homeplug HAN components 909, and ZigBee HAN components 910, monitoring and recording application components 911, control and reporting application components 912, identity and security application components 913, and web services application components 914, all of which may be integrated and interrelated with ESR logic fabric 901.

In one embodiment, ESR 900 can receive electrical distribution from utility distribution feeder for sensory and measurement functions, service monitoring, metering, and recording functions, service control and policy enforcement functions, and distributes electricity to electric circuit breaker box located at a customer's premises. ESR 900 may be connected to intelligent electric grid network 915 (e.g., the Advanced Metering Infrastructure (AMI) network) and/or to the Internet through WiMAX MAN/WAN component 907 and/or through Homeplug LAN component 908.

In one example of operation, ESR 900 may configure, sense, measure, monitor, meter, record, and control electric power being distributed to the customer premises. ESR 900 may then route information associated with the above functions to/from intelligent electric grid network 915.

In one example of operation, ESR 900 may deliver voice, video and/or data broadband services between computer systems or devices located on the customer's premises and the Internet using WiMAX MAN/WAN component 907 and/or Homeplug HAN component 909.

ESR 900 may further be connected via a Homeplug to WiFi bridge, to one or more WiFi devices on the customer's premises (e.g., a WiFi programmable communicating thermostat [PCT], a WiFi Gas meter, a WiFi water meter, a WiFi laptop/desktop), or the like.

ESR 900 may be connected via the ZigBee component 910, or via a Homeplug to ZigBee bridge, to one or more ZigBee devices on the customer's premises (e.g., a ZigBee programmable communicating thermostat [PCT], a ZigBee Gas meter, a ZigBee water meter), or the like.

ESR 900 may be connected via a Homeplug to ethernet bridge, to one or more Ethernet devices (e.g., a desktop computer with an ethernet network interface card [NIC]). In some embodiments, ESR 900 can be connected via a Homeplug to ZigBee bridge to one or more ZigBee devices (e.g., a ZigBee PCT, a ZigBee gas meter, a ZigBee water meter). ESR 900 may act as an interface between these other utility devices, such as the gas meter or the water meter, and utility organizations responsible for the utility devices. ESR 900 may allow the devices coupled to the Homeplug network located at the customer's premises to access information associated with ESR 900 (e.g., such as utility usage) and to connect to the Internet.

Referring to FIGS. 9B and 9C, in various embodiments, ESR 900 can provide an intelligent routing/switching path between different communication networks associated with ESR 900. In these examples, ESR 900 may route/switch data between layers associated with WiMAX MAN components 907, Homeplug LAN components 908, Homeplug MAN components 909, ZigBee HAN components 910, and the WiMAX WAN components 907.

Figure 10A:
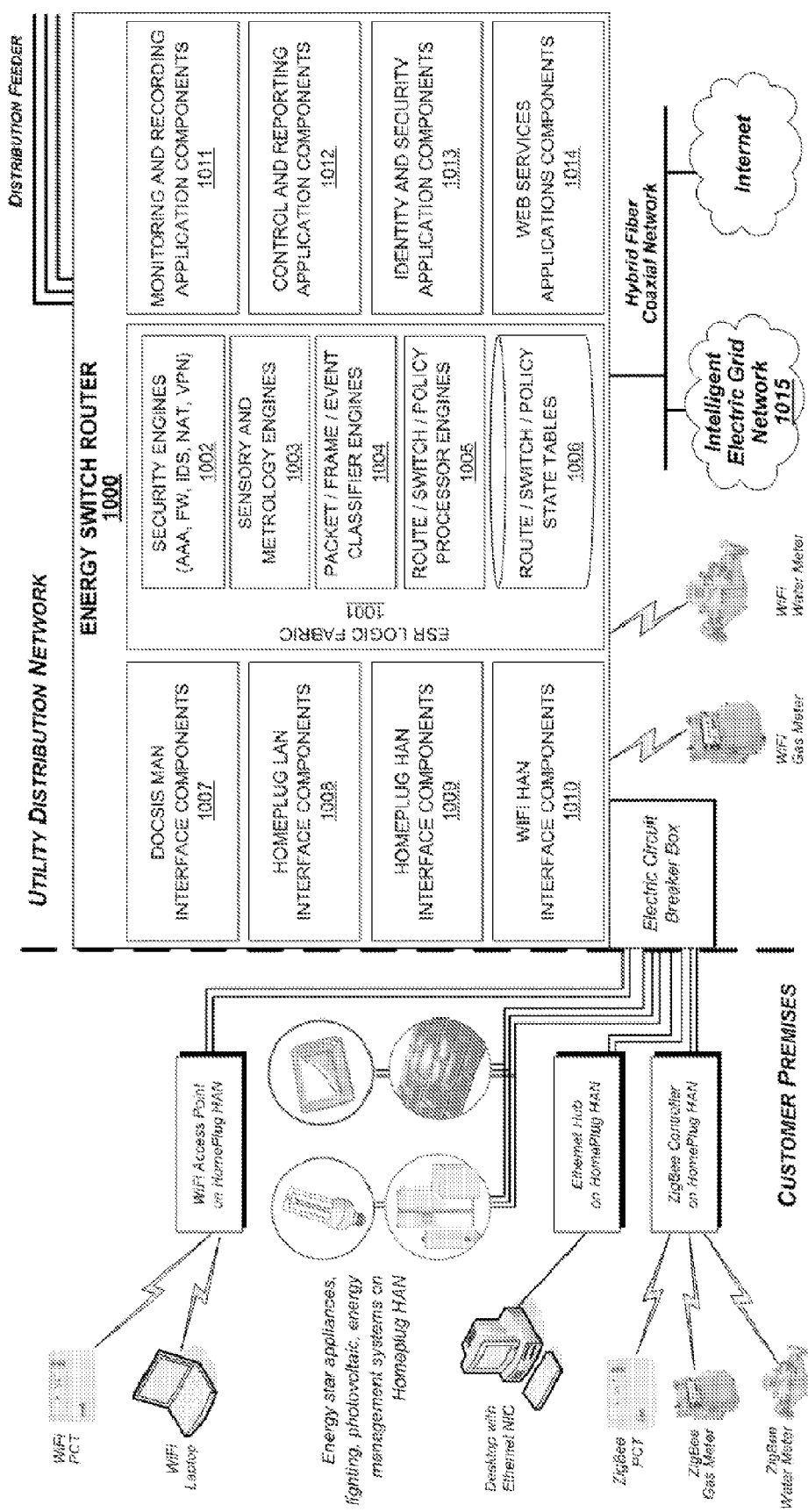
FIGS. 10A and 10B are block diagrams illustrating the use of the energy switch router for electric power distribution sensory, metrology, tariff/rate structured metering and accounting, service delivery and quality control, service monitoring and reporting, load control and shaping, utility policy enforcement, utility web services delivery, and secure internetworking communications in one embodiment according to the present invention.
Figure 10B:
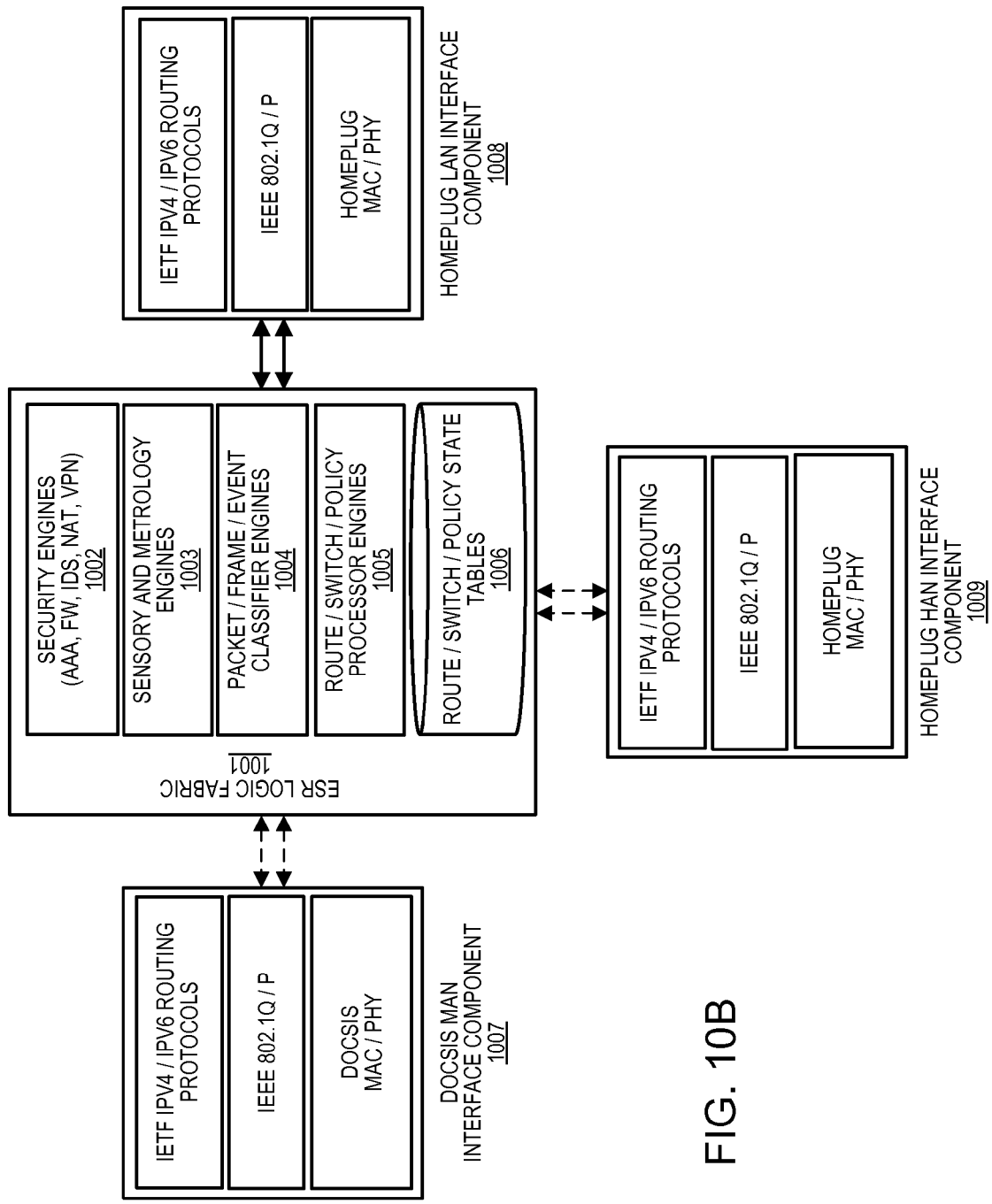

FIGS. 10A and 10B are block diagrams of ESR 1000 that provides utility sensory and measurement functions, service monitoring, metering, and recording functions, service control and policy enforcement functions, web-based configuration and utility service delivery interfaces, and secure internetworking communications into a single device in one embodiment according to the present invention. At the heart of ESR 1000 is ESR logic fabric 1001, which is comprised of security engines 1002, sensory and metrology engines 1003, packet/frame/event classifier engines 1004, route/switch/policy processor engines 1005, and route/switch/policy state tables 1006.

ERS 1000 can includes Data Over Cable Service Interface Specifications (DOCSIS) MAN components 1007, Homeplug LAN components 1008, Homeplug HAN components 1009, and WiFi HAN components 1010, monitoring and recording application components 1011, control and reporting application components 1012, identity and security application components 1013, and web services application components 1014, all of which are integrated and interrelated with the ESR logic fabric 1001 in one embodiment according to the present invention.

In various embodiments, ESR 1000 receives electrical distribution from utility distribution feeder for sensory and measurement functions, service monitoring, metering, and recording functions, service control and policy enforcement functions, and distributes electricity to electric circuit breaker box located at a customer's premises. ESR 1000 may be connected to intelligent electric grid network 1015 (e.g., the Advanced Metering Infrastructure (AMI) network) and/or to the Internet through the DOCSIS MAN components 1007 and/or through Homeplug LAN components 1008.

In one example of operation, ESR 1000 may configure, sense, measure, monitor, meter, record, and control electric power being distributed to the customer premises. ESR 1000 may then route information associated with the above functions to/from intelligent electric grid network 1015.

In another example of operation, ESR 1000 may deliver voice, video and/or data broadband services between computer systems or devices located on the customer's premises and the Internet using DOCSIS MAN component 1007 and Homeplug HAN component 1009.

ESR 1000 may be connected via WiFi component 1010, or via a Homeplug to WiFi bridge, to one or more WiFi devices on the customer's premises (e.g., a WiFi programmable communicating thermostat [PCT], a WiFi Gas meter, a WiFi water meter, a WiFi laptop/desktop), or the like.

ESR 1000 may be further connected via a Homeplug to ethernet bridge, to one or more Ethernet devices (e.g., a desktop computer with an ethernet network interface card [NIC]). In some embodiments, ESR 1000 can be further connected via a Homeplug to ZigBee bridge to one or more ZigBee devices (e.g., a ZigBee PCT, a ZigBee gas meter, a ZigBee water meter). ESR 1000 may act as an interface between these other utility devices, such as the gas meter or the water meter, and utility organizations responsible for the utility devices. ESR 1000 may allow the devices coupled to the Homeplug network located at the customer's premises to access information associated with ESR 1000 (e.g., such as utility usage) and to connect to the Internet.

Referring to FIG. 10B, ESR 1000 can provide an intelligent routing/switching path between different communication networks associated with ESR 1000. In these examples, ESR 1000 may route/switch data between layers associated with DOCSIS components 1007, Homeplug LAN components 1008, Homeplug MAN components 1009, and WiFi HAN components 1010.

Figure 11A:
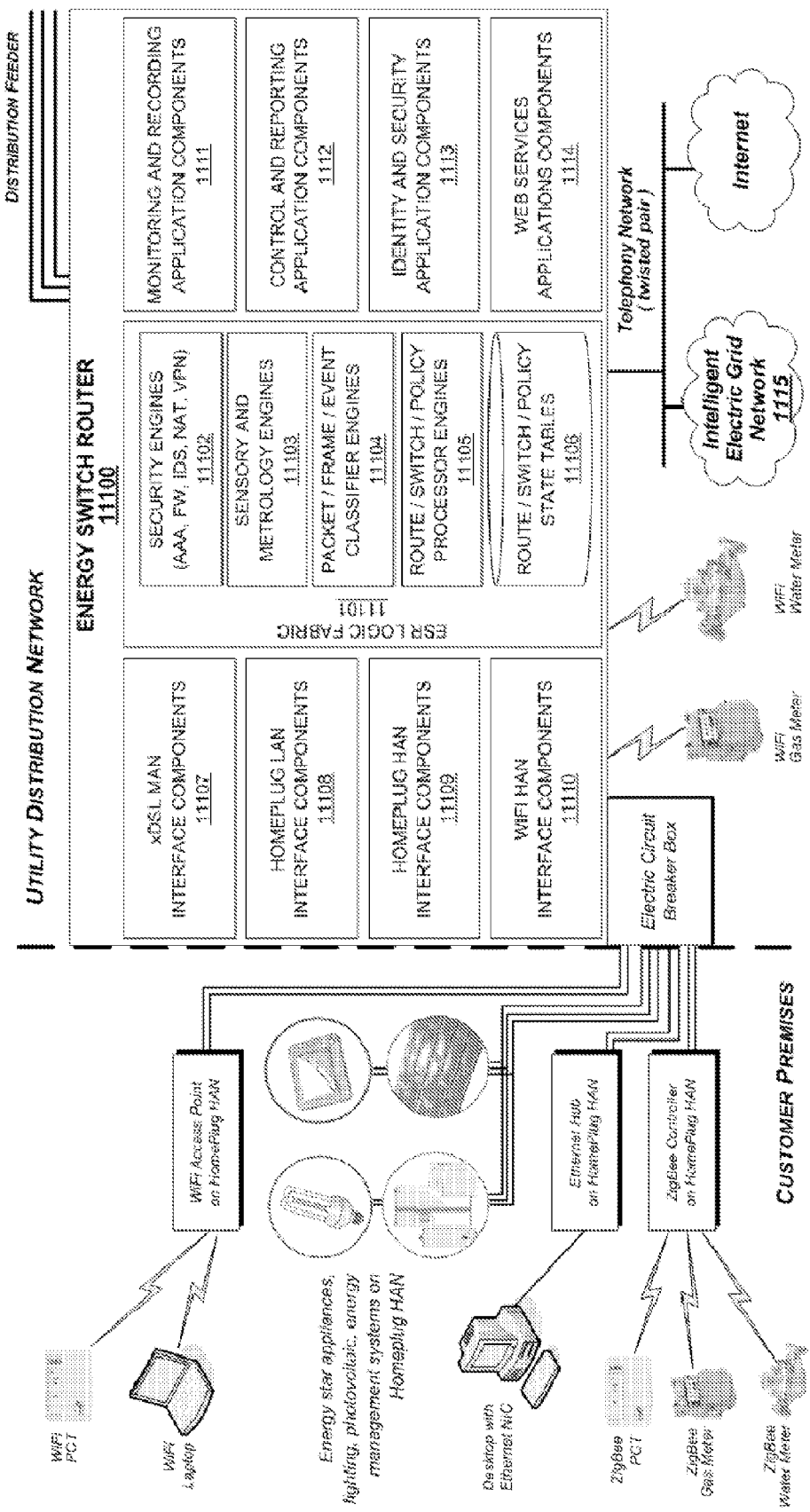
FIGS. 11A and 11B are block diagrams illustrating the use of the energy switch router for electric power distribution sensory, metrology, tariff/rate structured metering and accounting, service delivery and quality control, service monitoring and reporting, load control and shaping, utility policy enforcement, utility web services delivery, and secure internetworking communications in one embodiment according to the present invention.
Figure 11B:
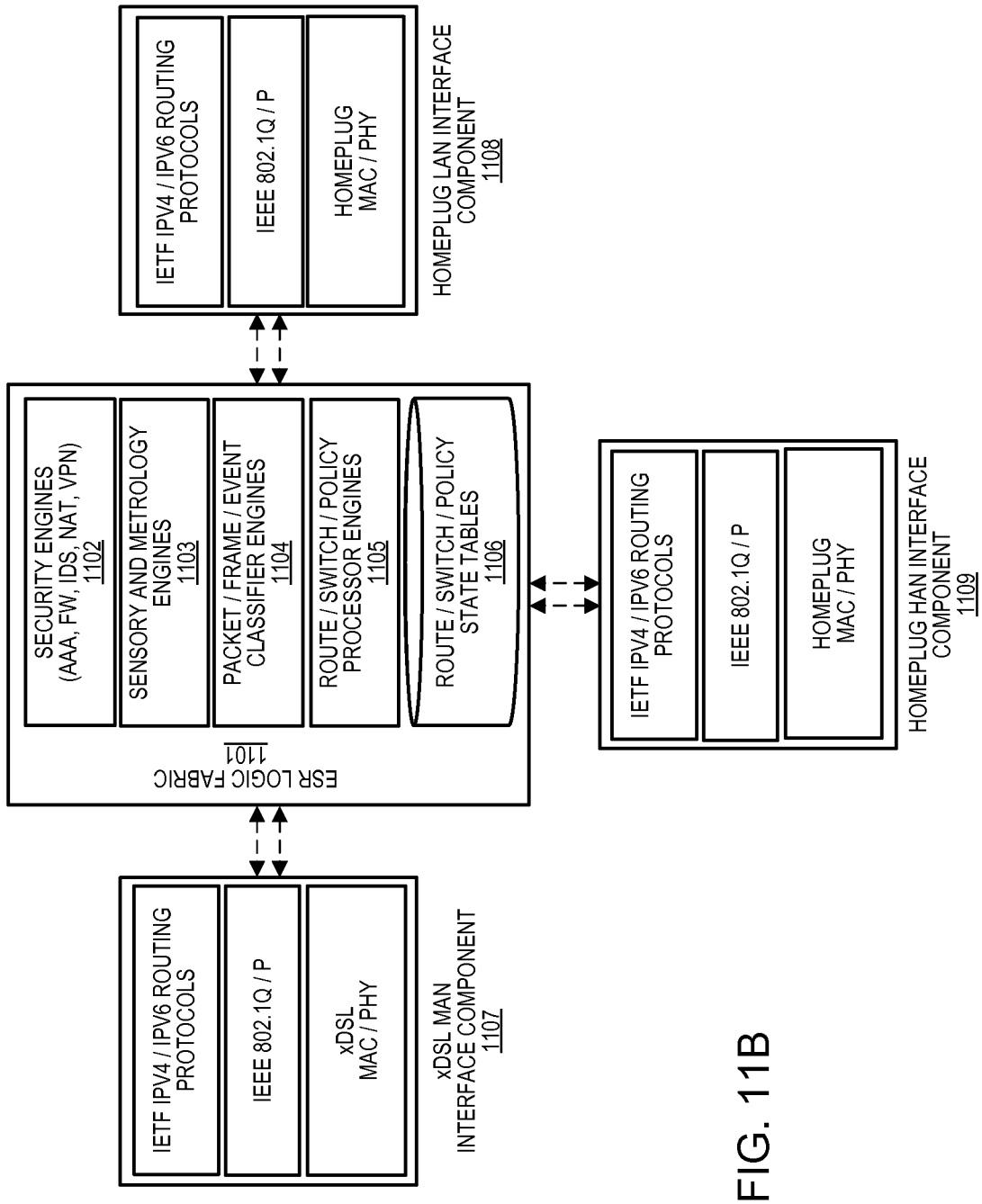

FIGS. 11A and 11B are block diagrams of ESR 1100 that provides utility sensory and measurement functions, service monitoring, metering, and recording functions, service control and policy enforcement functions, web-based configuration and utility service delivery interfaces, and secure internetworking communications into a single device in one embodiment according to the present invention. At the heart of the ESR 1100 is ESR logic fabric 1101, which can be comprised of security engines 1102, sensory and metrology engines 1103, packet/frame/event classifier engines 1104, route/switch/policy processor engines 1105, and route/switch/policy state tables 1106.

The one embodiment, ERS 1100 can also includes Digital Subscriber Line (xDSL) MAN components 1107, Homeplug LAN components 1108, Homeplug HAN components 1109, and WiFi HAN components 1110, monitoring and recording application components 1111, control and reporting application components 1112, identity and security application components 1113, and web services application components 1114, all of which can be integrated and interrelated with the ESR logic fabric 1101.

In some embodiments, ESR 1100 may receive electrical distribution from utility distribution feeder for sensory and measurement functions, service monitoring, metering, and recording functions, service control and policy enforcement functions, and distributes electricity to electric circuit breaker box located at a customer's premises. ESR 1100 may be connected to intelligent electric grid network 1115 (e.g., the Advanced Metering Infrastructure (AMI) network) and/or to the Internet through the xDSL MAN component 1107 and/or through the Homeplug LAN components 1108.

In one example of operation, ESR 1100 may configure, sense, measure, monitor, meter, record, and control electric power being distributed to the customer premises. ESR 1100 may then route information associated with the above functions to/from intelligent electric grid network 1115.

In another example of operation, ESR 1100 may deliver voice, video and/or data broadband services between computer systems or devices located on the customer's premises and the Internet using xDSL MAN component 1107 and the Homeplug HAN component 1109.

ESR 1100 may be connected via the WiFi component 1110, or via a Homeplug to WiFi bridge, to one or more WiFi devices on the customer's premises (e.g., a WiFi programmable communicating thermostat [PCT], a WiFi Gas meter, a WiFi water meter, a WiFi laptop/desktop), or the like.

ESR 1100 may be further connected via a Homeplug to ethernet bridge, to one or more Ethernet devices (e.g., a desktop computer with an ethernet network interface card [NIC]). In some embodiments, ESR 1100 can be connected via a Homeplug to ZigBee bridge to one or more ZigBee devices (e.g., a ZigBee PCT, a ZigBee gas meter, a ZigBee water meter). ESR 1100 may act as an interface between these other utility devices, such as the gas meter or the water meter, and utility organizations responsible for the utility devices. ESR 1100 may allow the devices coupled to the Homeplug network located at the customer's premises to access information associated with ESR 1100 (e.g., such as utility usage) and to connect to the Internet.

Referring to FIG. 11B, ESR 1100 can provide an intelligent routing/switching path between different communication networks associated with ESR 1100. In these examples, ESR 1100 may route/switch data between layers associated with xDSL components 1107, Homeplug LAN components 1108, Homeplug MAN components 1109, and WiFi HAN components 1110.

Figure 12A:
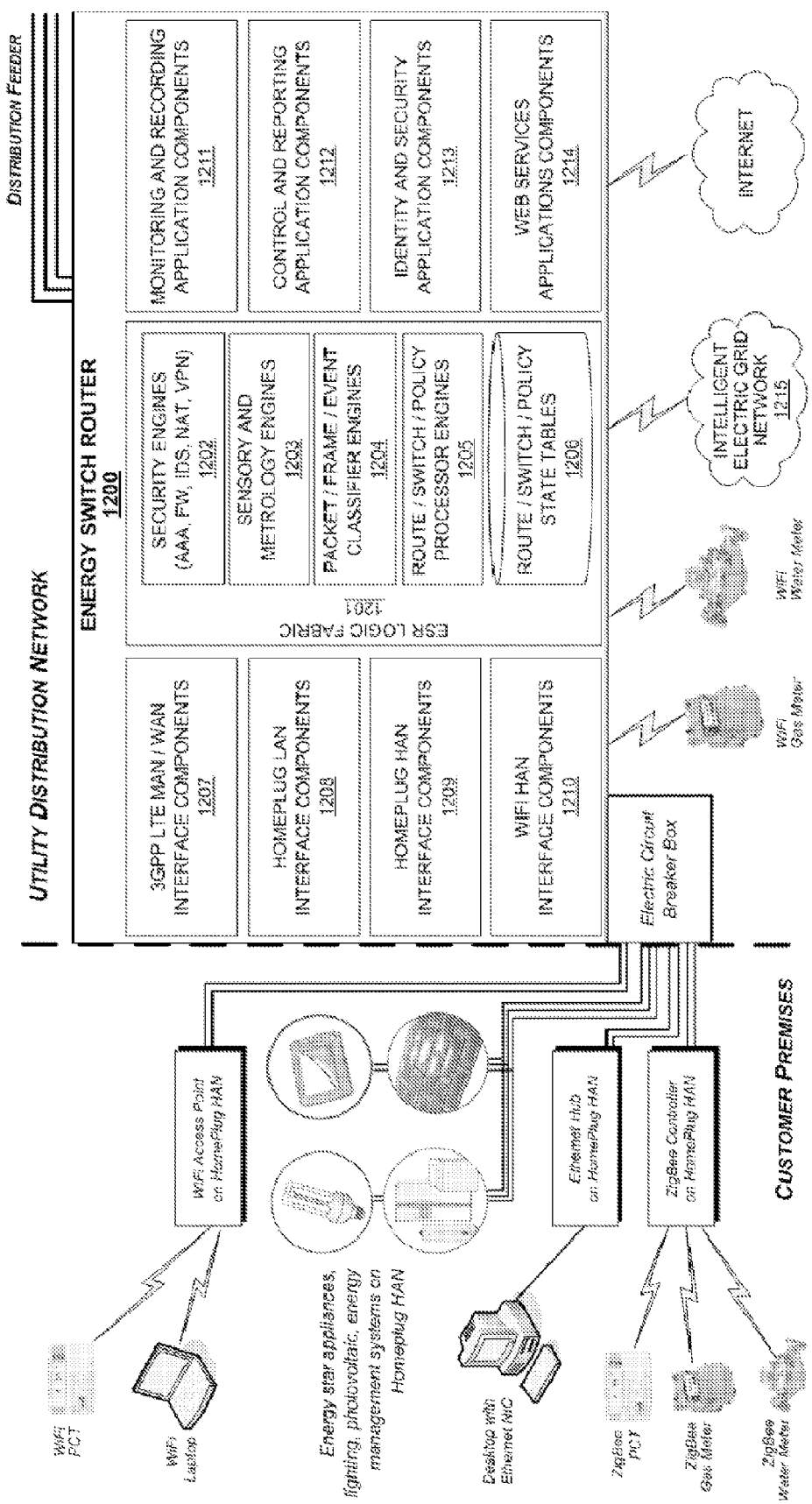
FIGS. 12A, 12B, and 12C are block diagrams illustrating the use of the energy switch router for electric power distribution sensory, metrology, tariff/rate structured metering and accounting, service delivery and quality control, service monitoring and reporting, load control and shaping, utility policy enforcement, utility web services delivery, and secure internetworking communications in one embodiment according to the present invention.
Figure 12B:
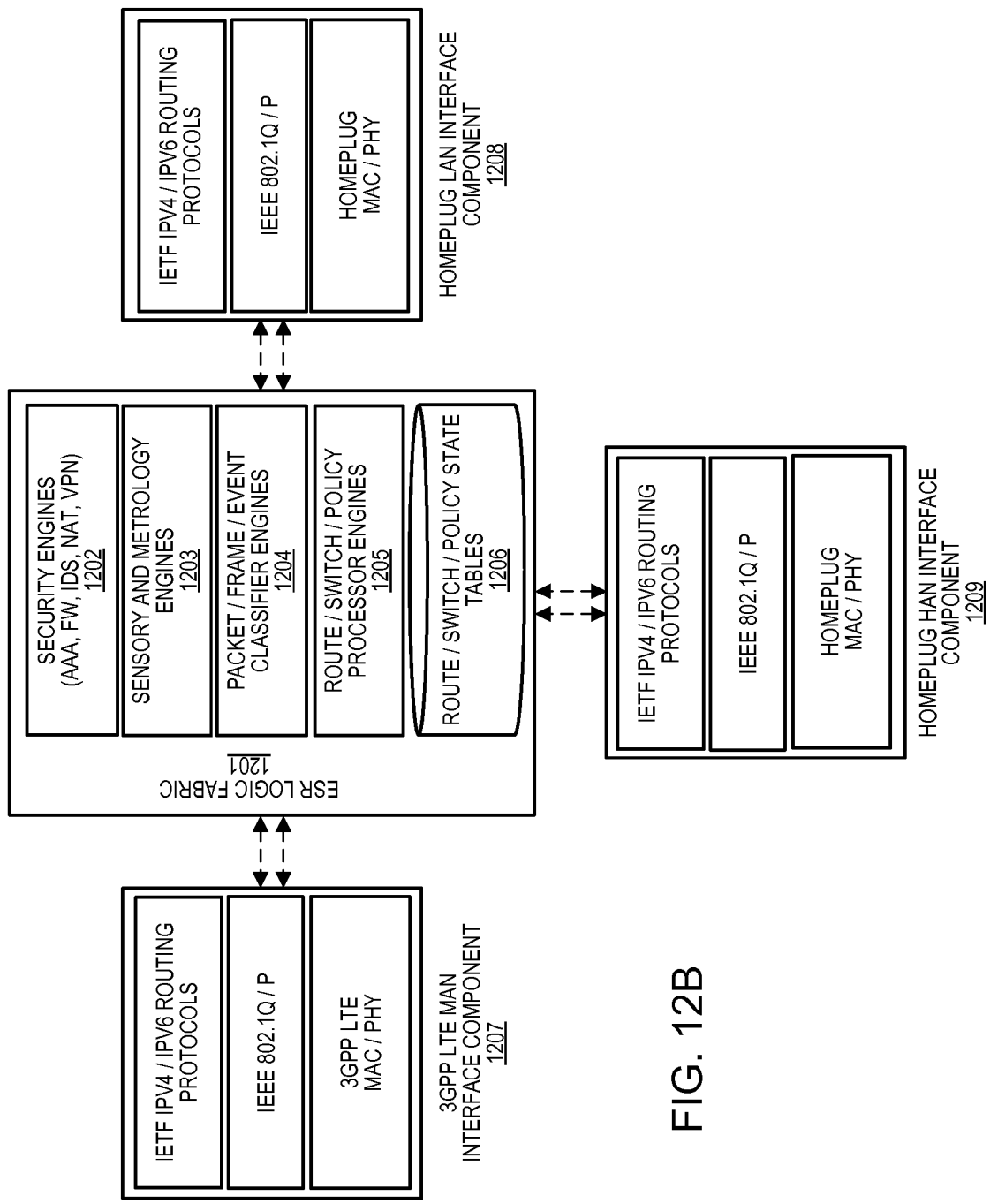
Figure 12C:
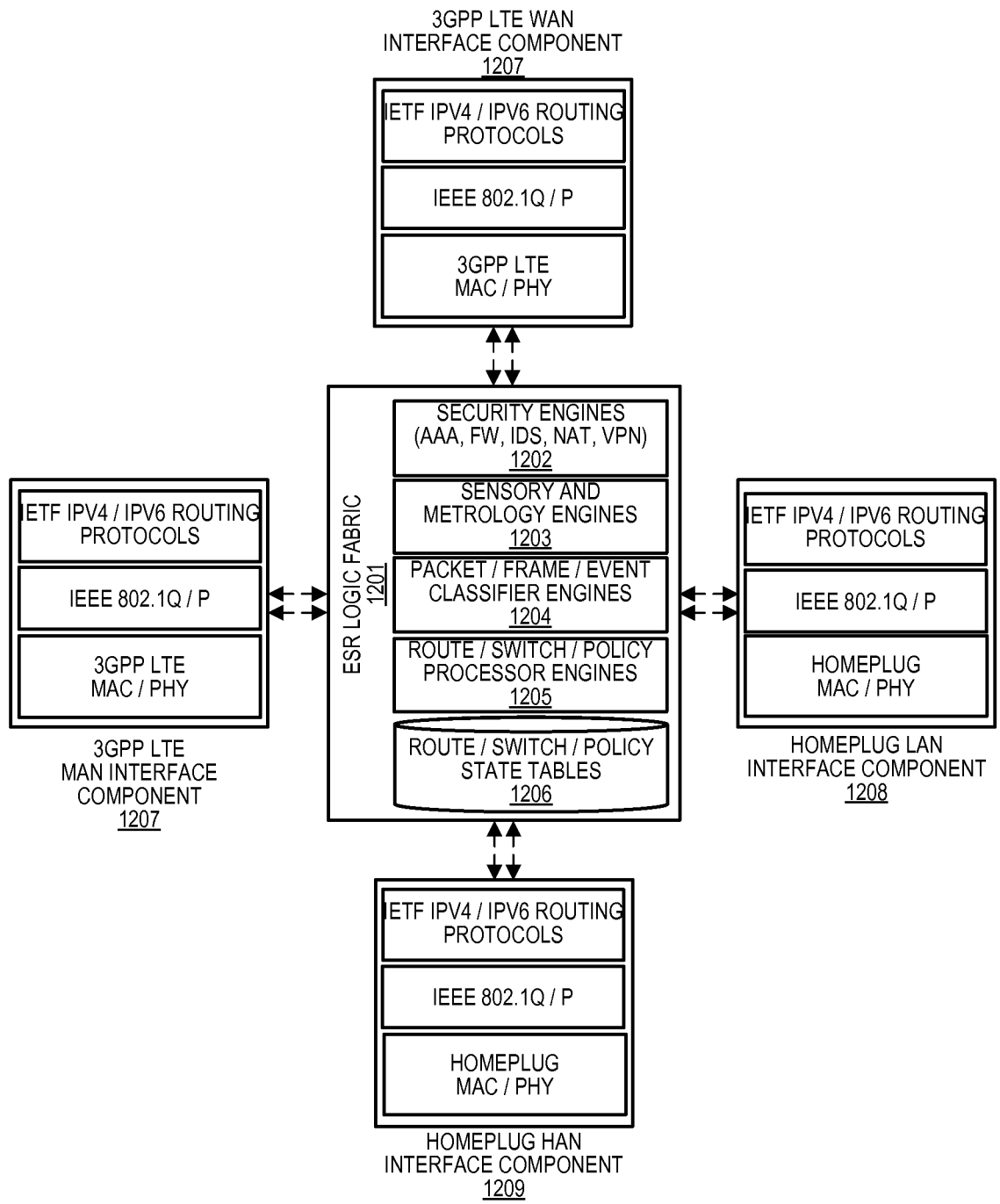

FIGS. 12A, 12B and 12C are block diagrams of ESR 1200 that provides utility sensory and measurement functions, service monitoring, metering, and recording functions, service control and policy enforcement functions, web-based configuration and utility service delivery interfaces, and secure internetworking communications into a single device in one embodiment according to the present invention. At the heart of the ESR 1200 is ESR logic fabric 1201, which can be comprised of security engines 1202, sensory and metrology engines 1203, packet/frame/event classifier engines 1204, route/switch/policy processor engines 1205, and route/switch/policy state tables 1206.

In various embodiments, ERS 1200 can includes 3GPP LTE MAN/WAN components 1207, Homeplug LAN components 1208, Homeplug HAN components 1209, and WiFi HAN components 1210, monitoring and recording application components 1211, control and reporting application components 1212, identity and security application components 1213, and web services application components 1214, all of which can be integrated and interrelated with ESR logic fabric 1201.

In some embodiments, ESR 1200 may receive electrical distribution from utility distribution feeder for sensory and measurement functions, service monitoring, metering, and recording functions, service control and policy enforcement functions, and distributes electricity to electric circuit breaker box located at a customer's premises. ESR 1200 may be connected to intelligent electric grid network 1215 (e.g., the Advanced Metering Infrastructure (AMI) network) and/or to the Internet through the 3GPP LTE MAN/WAN component 1207 and/or through the Homeplug LAN component 1208.

In one example of operation, ESR 1200 may configure, sense, measure, monitor, meter, record, and control electric power being distributed to the customer premises. ESR 1200 may then route information associated with the above functions to/from intelligent electric grid network 1215.

In another example of operation, ESR 1200 may deliver voice, video and/or data broadband services between computer systems or devices located on the customer's premises and the Internet using the 3GPP LTE MAN/WAN component 1207 and Homeplug HAN component 1209.

ESR 1200 may further be connected via WiFi component 1210, or via a Homeplug to WiFi bridge, to one or more WiFi devices on the customer's premises (e.g., a WiFi programmable communicating thermostat [PCT], a WiFi Gas meter, a WiFi water meter, a WiFi laptop/desktop), or the like.

ESR 1200 may be further connected via a Homeplug to ethernet bridge, to one or more Ethernet devices (e.g., a desktop computer with an ethernet network interface card [NIC]). In some embodiments, ESR 1200 may be further connected via a Homeplug to ZigBee bridge to one or more ZigBee devices (e.g., a ZigBee PCT, a ZigBee gas meter, a ZigBee water meter). ESR 1200 may act as an interface between these other utility devices, such as the gas meter or the water meter, and utility organizations responsible for the utility devices. ESR 1200 may allow the devices coupled to the Homeplug network located at the customer's premises to access information associated with ESR 1200 (e.g., such as utility usage) and to connect to the Internet.

Referring to FIGS. 12B and 12C, ESR 1200 may provide an intelligent routing/switching path between different communication networks associated with ESR 1200. In these examples, ESR 1200 can route/switch data between layers associated with the 3GPP LTE MAN components 1207, Homeplug LAN components 1208, Homeplug MAN components 1209, and 3GPP LTE WAN components 1207.

Figure 13:
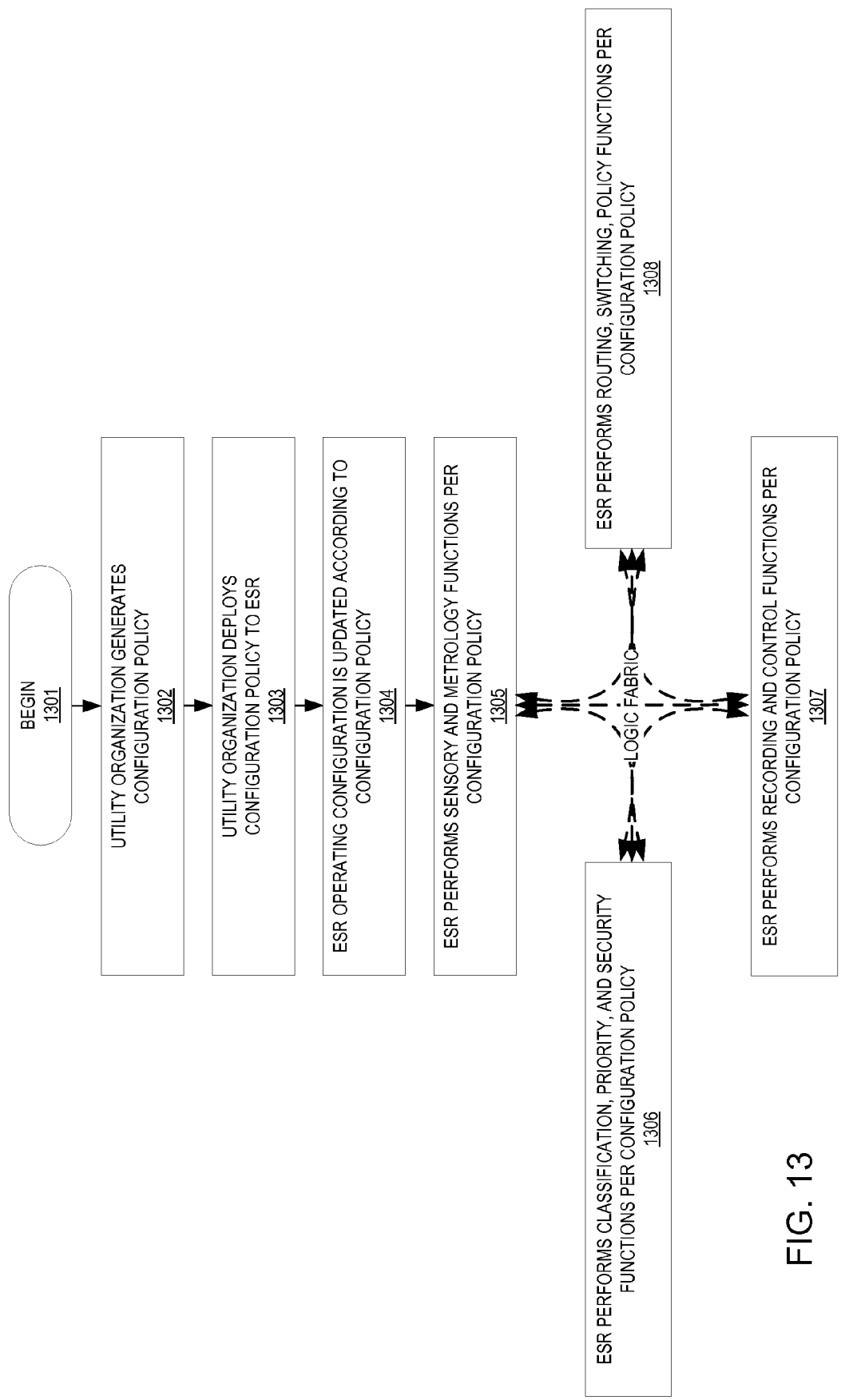
FIG. 13 is a flowchart of a method for configuration policy deployment to an energy switch router, and the energy switch router's enforcement of the configuration policy in one embodiment according to the present invention.

FIG. 13 is a flowchart of a method for policy-based configuration of energy switch routing functions in one embodiment according to the present invention. The processing depicted in FIG. 13 may be performed by software modules (e.g., instructions or code) executed by a processor of an energy switch router or ESR (e.g., ESR 700 of FIG. 3), by hardware modules, or combinations thereof. FIG. 13 begins in step 1301.

In step 1302, a utility organization generates a configuration policy. Some examples of utility organizations are an electric company, a natural gas/propane distributor, a municipal water district, a sewer company, and the like. The utility organization may use a variety of software applications to generate the configuration policy. In one embodiment, the utility company generates the configuration policy using a COPS-PR based policy engine.

In step 1303, the utility organization deploys the configuration policy to one or more ESRs (e.g., ESR 700). The utility organization may deploy the configuration policy from a centralized location to a plurality of distributed ESRs using the organization's private network (e.g., Intelligent Electric Grid Network). The utility organization may also deploy the configuration policy from a centralized location to the plurality of distributed ESRs using a public networks, such as the Internet. The utility organization may also deploy the configuration policy when the ESR is installed at a customer's premises or at a location associated with the organization's utility network or distribution infrastructure.

In step 1304, ESR 700's operating configuration is updated according to the configuration policy. For example, the configuration policy may define the conditions under which ESR 700 operates, the type and format of data is recorded and stored by metrology functions associated with ESR 700, mechanisms for reporting and/or forwarding the data, and the like.

In step 1305, ESR 700 performs one or more sensory, and/or metrology functions as defined by the configuration policy.

In step 1306, ESR 700 performs one or more classification, prioritization, and/or security functions as defined by the configuration policy.

In step 1307, ESR 700 performs one or more recording and control functions as defined by the configuration policy.

In step 1308, ESR 700 performs one or more routing, switching, and/or policy enforcement functions as defined by the configuration policy.

Figure 14:
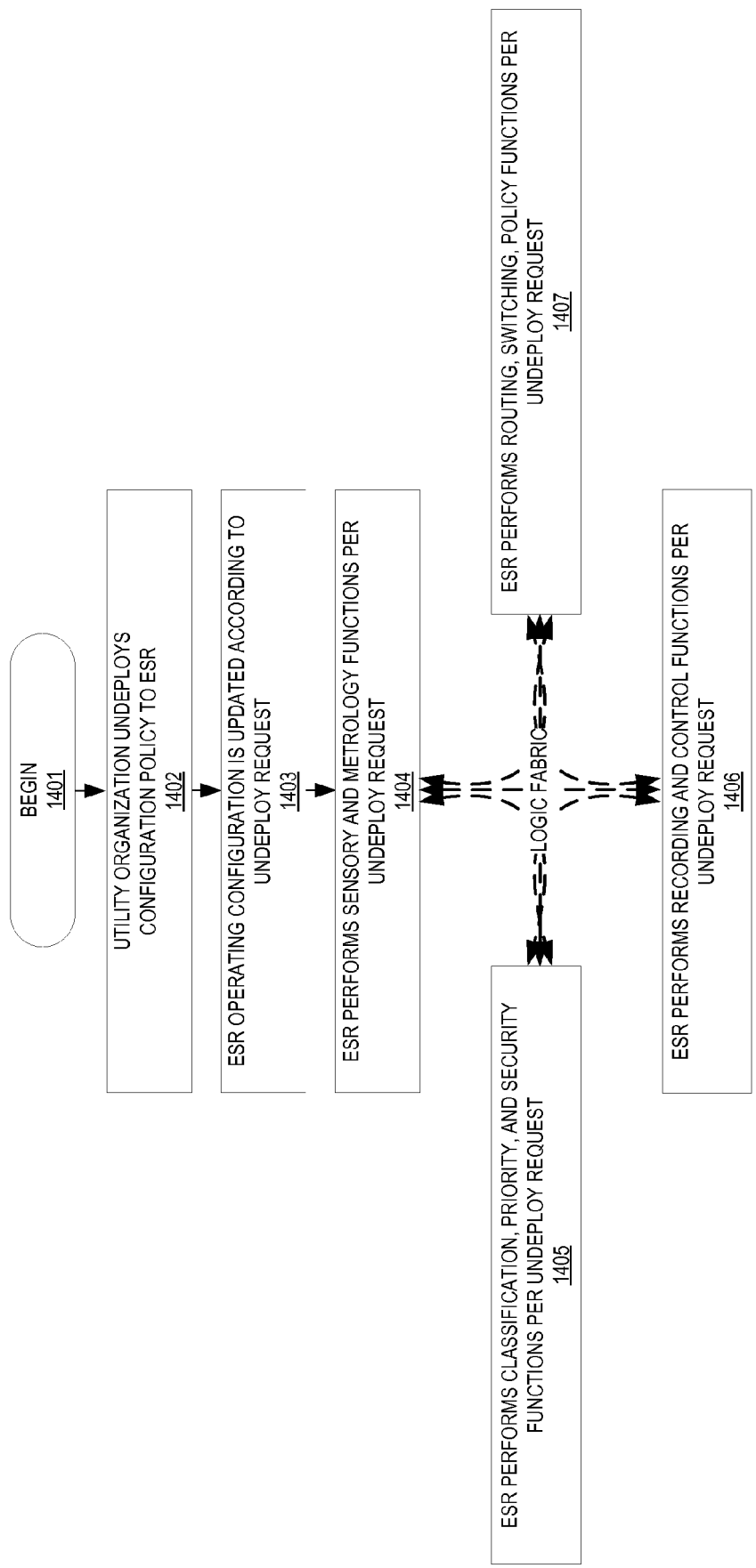
FIG. 14 is a flowchart of a method for the configuration policy un-deployment from an energy switch router, and the energy switch router's subsequent enforcement of the changed policy state in one embodiment according to the present invention.

FIG. 14 is a flowchart of a method for removal of policy-based configuration of energy switch routing functions in one embodiment according to the present invention. The processing depicted in FIG. 14 may be performed by software modules (e.g., instructions or code) executed by a processor of an energy switch router or ESR (e.g., ESR 700 of FIG. 3), by hardware modules, or combinations thereof. FIG. 14 begins in step 1401.

In step 1402, a utility organization undeploys a configuration policy previously deployed to ESR 700. The utility organization may undeploy the configuration policy from a centralized location to a plurality of distributed ESRs using the organization's private network (e.g., Intelligent Electric Grid Network). The utility organization may also undeploy the configuration policy from a centralized location to the plurality of distributed ESRs using a public networks, such as the Internet. The utility organization may also deploy the configuration policy when the ESR is installed at a customer's premises or at a location associated with the organization's utility network or distribution infrastructure.

In step 1403, ESR 700's operating configuration is updated according to the undeploy request.

In step 1404, ESR 700 performs one or more sensory, and/or metrology functions as defined by the undeploy request.

In step 1405, ESR 700 performs one or more classification, prioritization, and/or security functions as defined by the undeploy request.

In step 1406, ESR 700 performs one or more recording and control functions as defined by the undeploy request.

In step 1407, ESR 700 performs one or more routing, switching, and/or policy enforcement functions as defined by the undeploy request.

Figure 15:
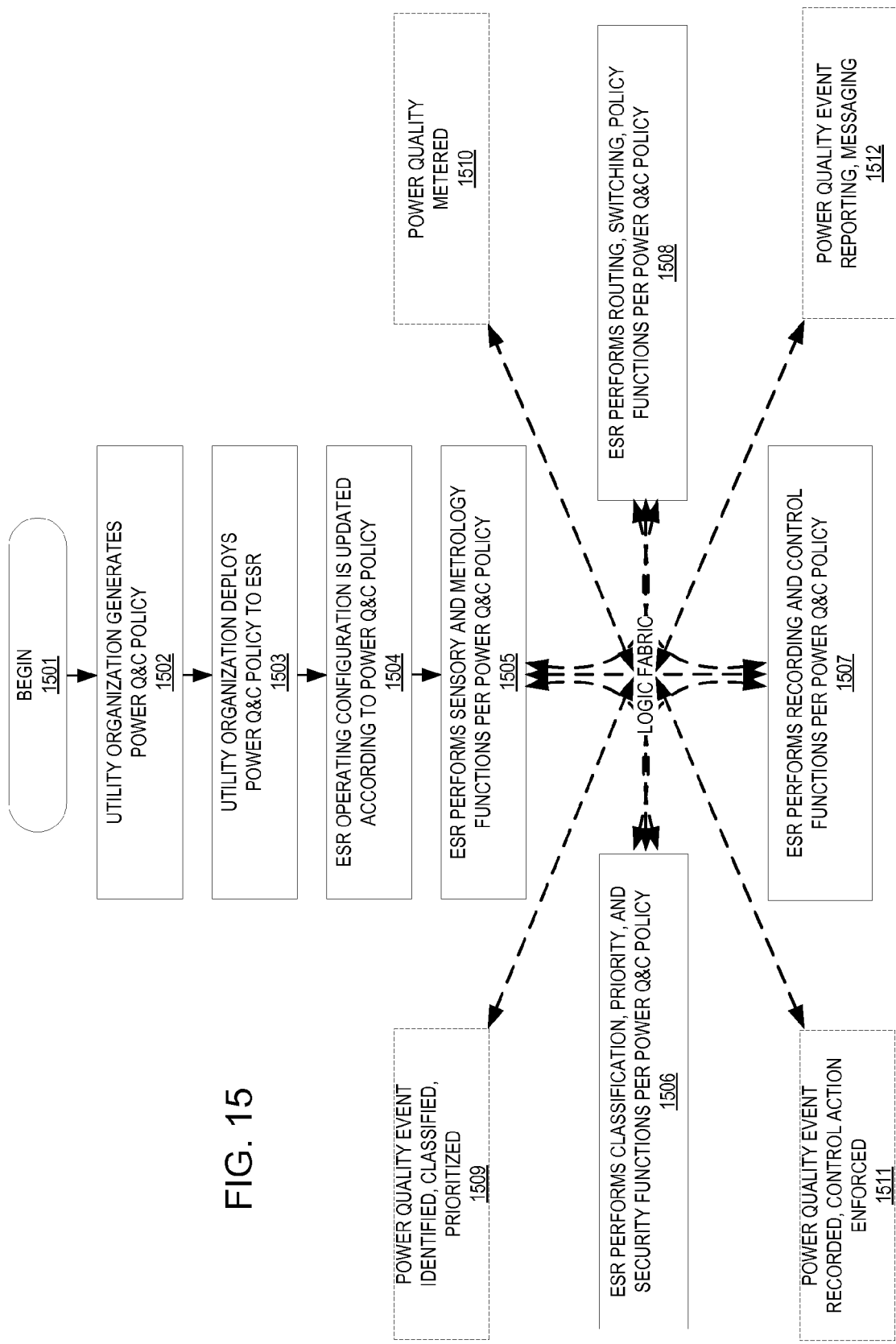
FIG. 15 is a flowchart of a method for the deployment of a power quality and control policy to an energy switch router, and the device's subsequent enforcement of the power quality and control policy in one embodiment according to the present invention.

FIG. 15 is a flowchart of a method for power quality and control policy deployment and enforcement in one embodiment according to the present invention. FIG. 15 begins in step 1501. In step 1502, a utility organization generates a Power Q&C policy. In one example, the Power Q&C policy defines a set of limits or thresholds that when satisfied determine the quality or grade of energy distribution. The Power Q&C policy may further define one or more actions to be performed when the quality or grade of energy distribution satisfies or fails to satisfy the set of limits or thresholds.

In step 1503, the utility organization deploys the Power Q&C policy to an energy switch router or ESR (e.g., ESR 700 of FIG. 3). In step 1504, ESR 700's operating configuration is updated according to the Power Q&C. For example, ESR 700 may configure one or more alarms or notification events associated with the utility meter based on the set of thresholds defining the quality or grade of energy distribution.

In step 1505, ESR 700 performs one or more sensory, and/or metrology functions as defined by the Power Q&C policy.

In step 1506, ESR 700 performs one or more classification, prioritization, and/or security functions as defined by the Power Q&C policy.

In step 1507, ESR 700 performs one or more recording and control functions as defined by the Power Q&C policy.

In step 1508, ESR 700 performs one or more routing, switching, and/or policy enforcement functions as defined by the Power Q&C policy.

In step 1509, ESR 700 identifies, classifies, and prioritizes a Power Q&C event per the deployed policy logic.

In step 1510, ESR 700 meters a Power Q&C event per the deployed policy logic.

In step 1511, ESR 700 records and controls the Power Q&C event per the deployed policy logic.

In step 1512, ESR 700 performs one or more Power Q&C event reporting and messaging per the deployed policy logic.

Figure 16:
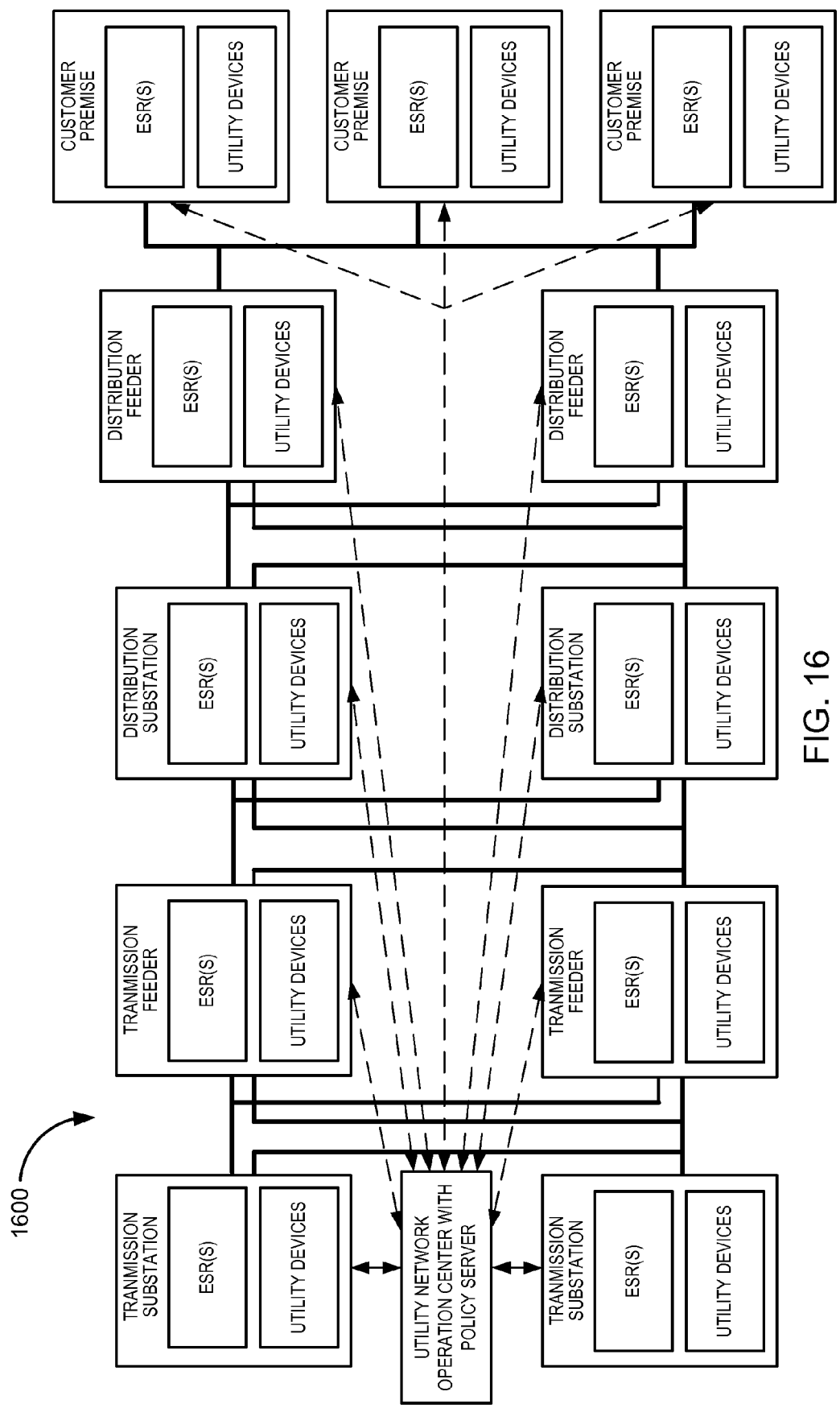
FIG. 16 is a block diagram depicting a policy networking-based predictive, self-adaptive, self-optimizing, fault-sensing, self-healing, and secure intelligent electric grid infrastructure in one embodiment according to the present invention.

FIG. 16 is a block diagram of a self-healing intelligent electric grid network 1600 in one embodiment according to the present invention. In various examples, utilities (e.g., electricity, water, and gas) can be distributed from a utility main office or other generation locations, transmission locations, transmission feeder locations, distribution locations, distribution feeder location, or the like, to one or more substations, industrial, commercial, and/or residential end points and/or customer premises.

In various embodiments, a utility network operation center (NOC) with one or more policy servers provides intelligence for communication, management, and healing of all or part of devices associated with a utility network. For example, one or more utility NOCs may communicate with ESRs and utility devices at generation stations, transmissions substations, transmission feeder substations, distribution substations, distribution feeder substations, and the customer premises.

Each ESR may be configured to control the utility devices. Some examples of utility devices are meters, switches, transformers, generators, converters, valves, pumps, and the like. In one example, a distribution substation can be configured to distribute one or more utilities to distribution feeders or consumer premises primarily using a first distribution line or network. The distribution station may be configured to distribute the one or more utilities to other distribution feeders secondarily using a second distribution line or network.

The utility NOC and/or each of the ESRs may periodically communicate. For example, the utility NOC may request or poll utility usage and consumption information from one or more ESRs located at customer premises. The utility NOC may also send new policies, forward policy updates, and send instructions to remove old polices from any ESRs. In another example, one or more ESRs may be configured to send data upstream to an ESR or the utility NOC.

In one example of operation, a failure in the distribution of a utility to one or more ESRs distributed throughout the utility grid be detected by the one or more ESRs. Affected ESRs may generate and transmit a message indicative of the failure to the utility NOC. An affected ESR may further transmit a message or raise an event with another ESR for forwarding (e.g., routing/switching) if the utility NOC cannot be directly contacted. Accordingly, a problem resulting in the failure may then be quickly isolated and fix. As a result, work crews may be automatically notified and dispatched to a particular location, such as the customer premises.

In yet another example of operation, each ESR within the utility network may remedy a failure in the distribution of the utility by requesting actions be performed by one or more other ESRs. An ESR in one substation may instruct another ESR in another substation to operate one or more utility devices to reroute utility distribution. Thus, ESRs may intelligently communicate based on policy configurations to automatically heal and repair the utility network.

Figure 17:
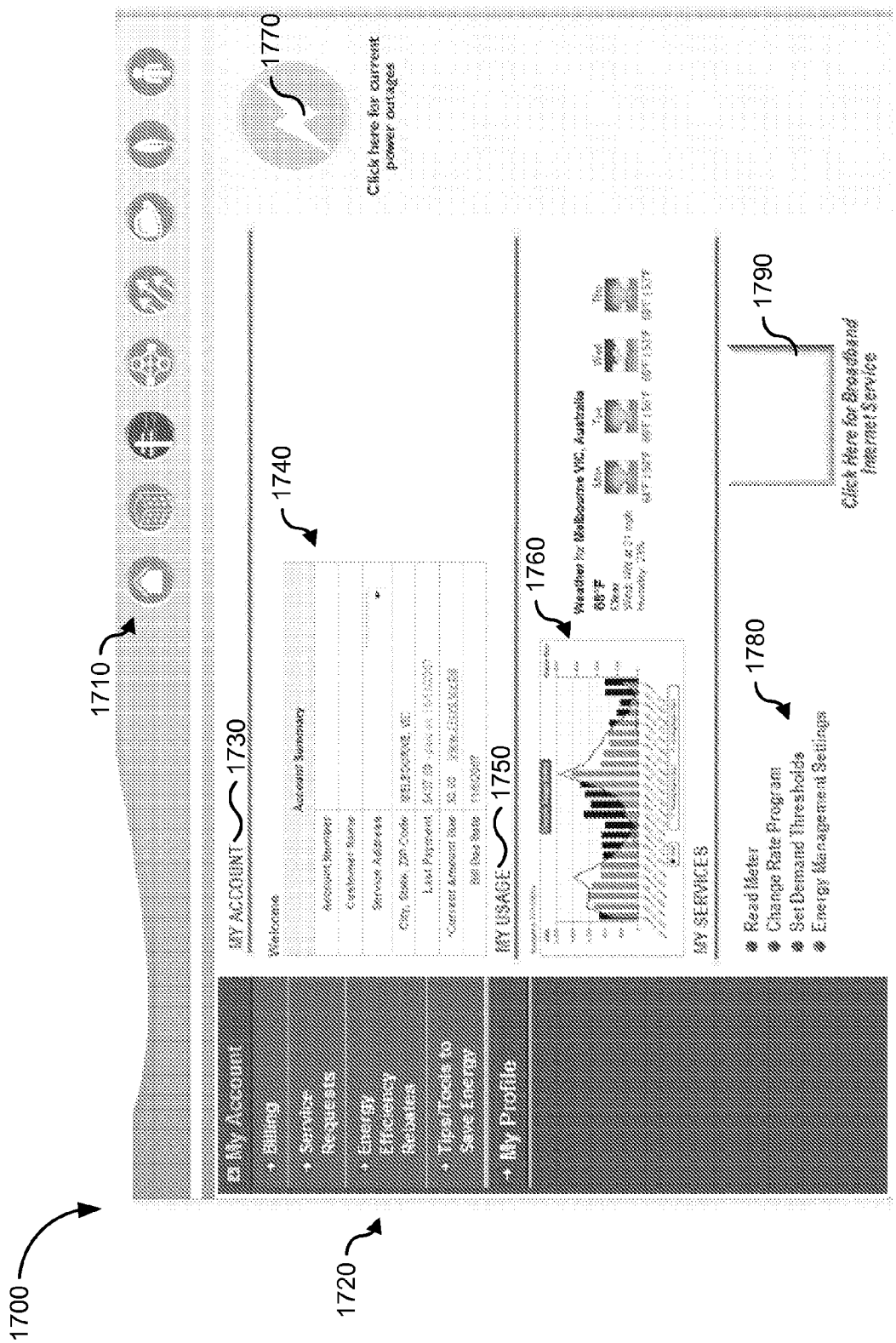
FIG. 17 is a screenshot of an energy switch router secure web services interface in one embodiment according to the present invention.

FIG. 17 is a screenshot of web service interface 1700 that may be associated with an ESR in one embodiment according to the present invention. Secure utility interface 1700 includes one or more navigation buttons 1710 configured to access various features or functionality of interface 1700.

Menu 1720 can be displayed to a user and include navigation options, such as "My Account," "Billing," "Service Request," "Energy Efficiency Rebates," "Tips/Tools to Save Energy," "My Profile," and the like. Interface 1700 may further include an area 1730 labeled "My Account" which displays summary of account information (e.g., account number, customer name, service address, payment information, and the like) in area 1740. In an area 1750 labeled "My Usage," interface 1700 may display information associated with utility usage. For example, interface 1700 can include a bar graph 1760 that displays historical data related to utility usage.

In some embodiments, web service interface 1700 can include a navigation button 1770 that enables a user to obtain information associated with current power outages. In an area 1780 labeled "My Services," interface 1700 can display icons or indicators associated with actions a user can perform in conjunction with the user's service (e.g., read a meter, change rate program, set demand thresholds, establish energy management settings, and the like).

Interface 1700 may further include navigation button 1790 which allows a user to subscribe to a broadband connection to the Internet through the smart meter. For example, a user may be coupled wireless to an ESR via a local area network when the ESR acts as a wireless access point. The user may obtain Internet access using the ESR via a WiMAX modem, xDSL modem, DOCSIS cable mode, or BPL modem associated with the ESR that already may be used by a utility organization to orchestrate an intelligent electric grid network.

Figure 18:
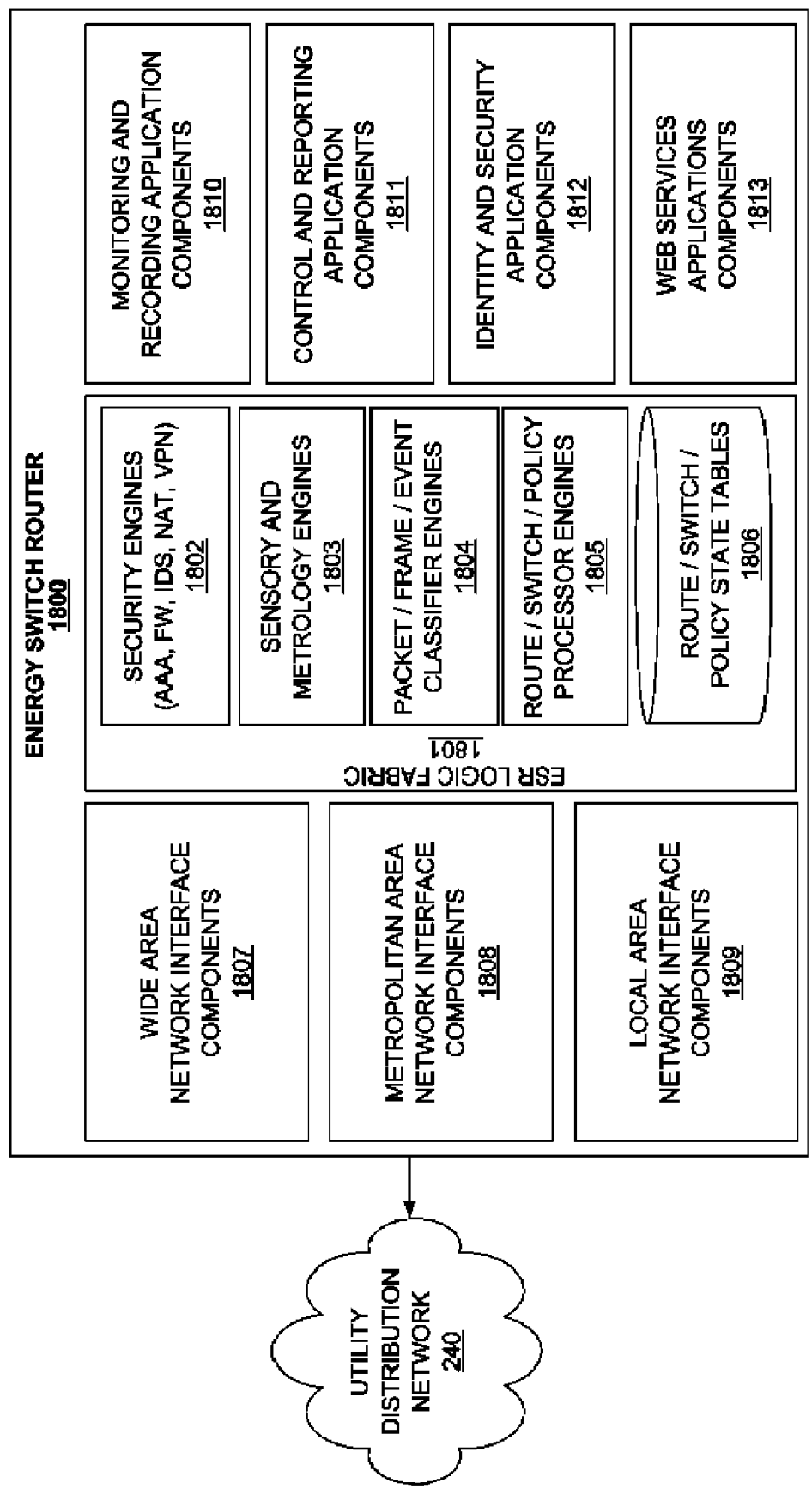
FIG. 18 is a is a block diagram depicting a utility distribution network energy switch router device that enables a policy networking-based predictive, self-adaptive, self-optimizing, fault-sensing, self-healing, and secure intelligent electric grid network, and which is configured and accessed via secure web services interfaces, in one embodiment according to the present invention.

FIG. 18 is an embodiment of ESR 1800 for utility distribution in one embodiment according to the present invention. ESR 1800 can include ESR logic fabric 1801, security engines 1802, sensory and metrology engines 1803, packet/frame/event classifier engines 1804, route/switch/policy processor engines 1805, and route/switch/policy state tables 1806. ESR 1800 may include wide area network interface components 1807, metropolitan area network interface components 1808, local area network interface components 1809, monitoring and recording application components 1810, control and reporting application components 1811, identity and security application components 1812, and web services applications components 1813.

In various embodiments, ESR 1800 may communicate with and be provisioned using a policy-based configuration, analytics, and control mechanism via utility distribution network 1814.

Figure 19:
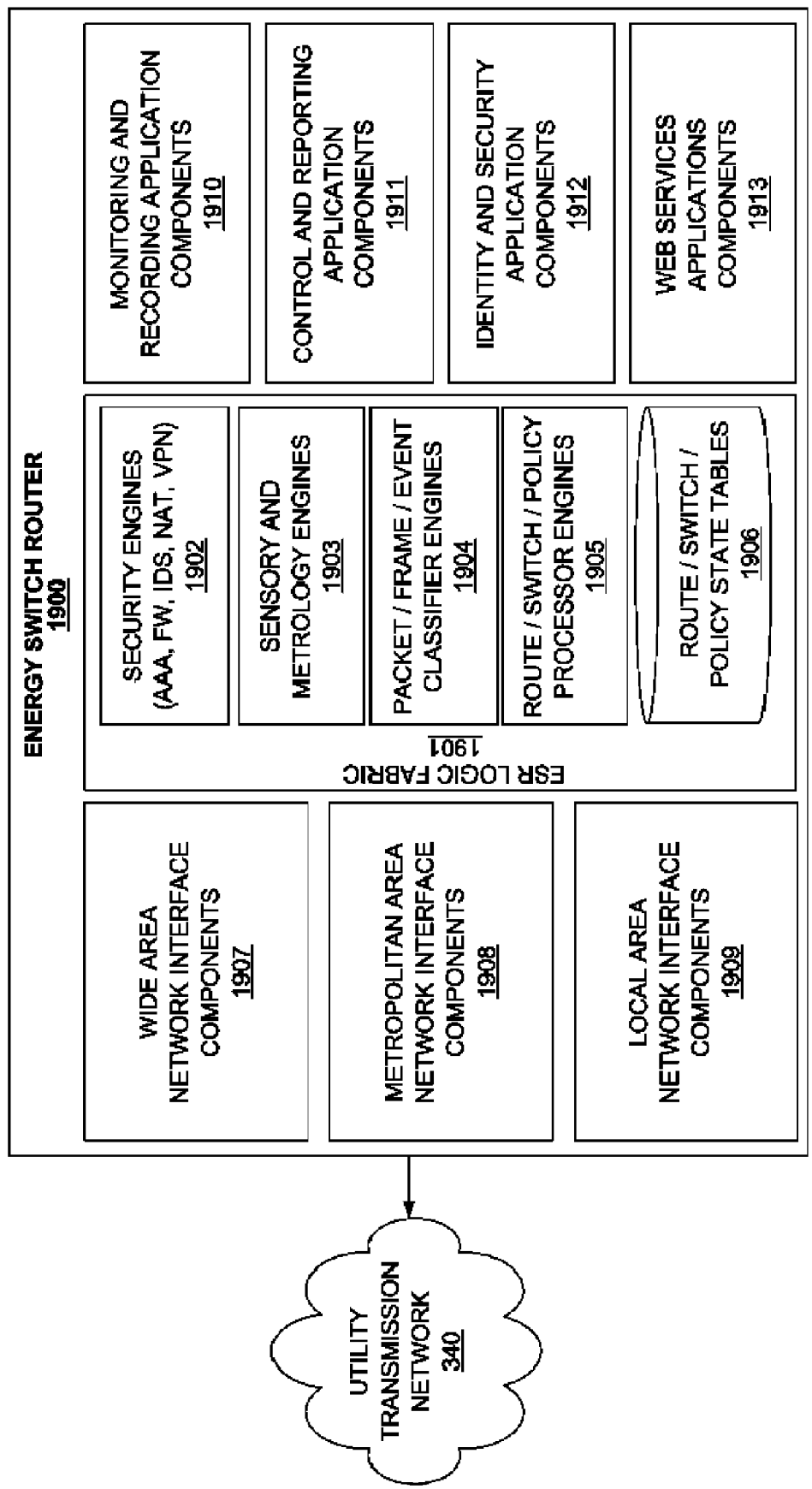
FIG. 19 is a is a block diagram depicting a utility transmission network energy switch router device that enables a policy networking-based predictive, self-adaptive, self-optimizing, fault-sensing, self-healing, and secure intelligent electric grid network, and which is configured and accessed via secure web services interfaces, in one embodiment according to the present invention.

FIG. 19 is an embodiment of ESR 1900 for utility transmission in one embodiment according to the present invention. ESR 1900 can include ESR logic fabric 1901, security engines 1902, sensory and metrology engines 1903, packet/frame/event classifier engines 1904, route/switch/policy processor engines 1905, and route/switch/policy state tables 1906. ESR 1900 may include wide area network interface components 1907, metropolitan area network interface components 1908, local area network interface components 1909, monitoring and recording application components 1910, control and reporting application components 1911, identity and security application components 1912, and web services applications components 1913.

In various embodiments, ESR 1900 may communicate with and be provisioned using a policy-based configuration, analytics, and control mechanism via utility transmission network 1914.

Figure 20:
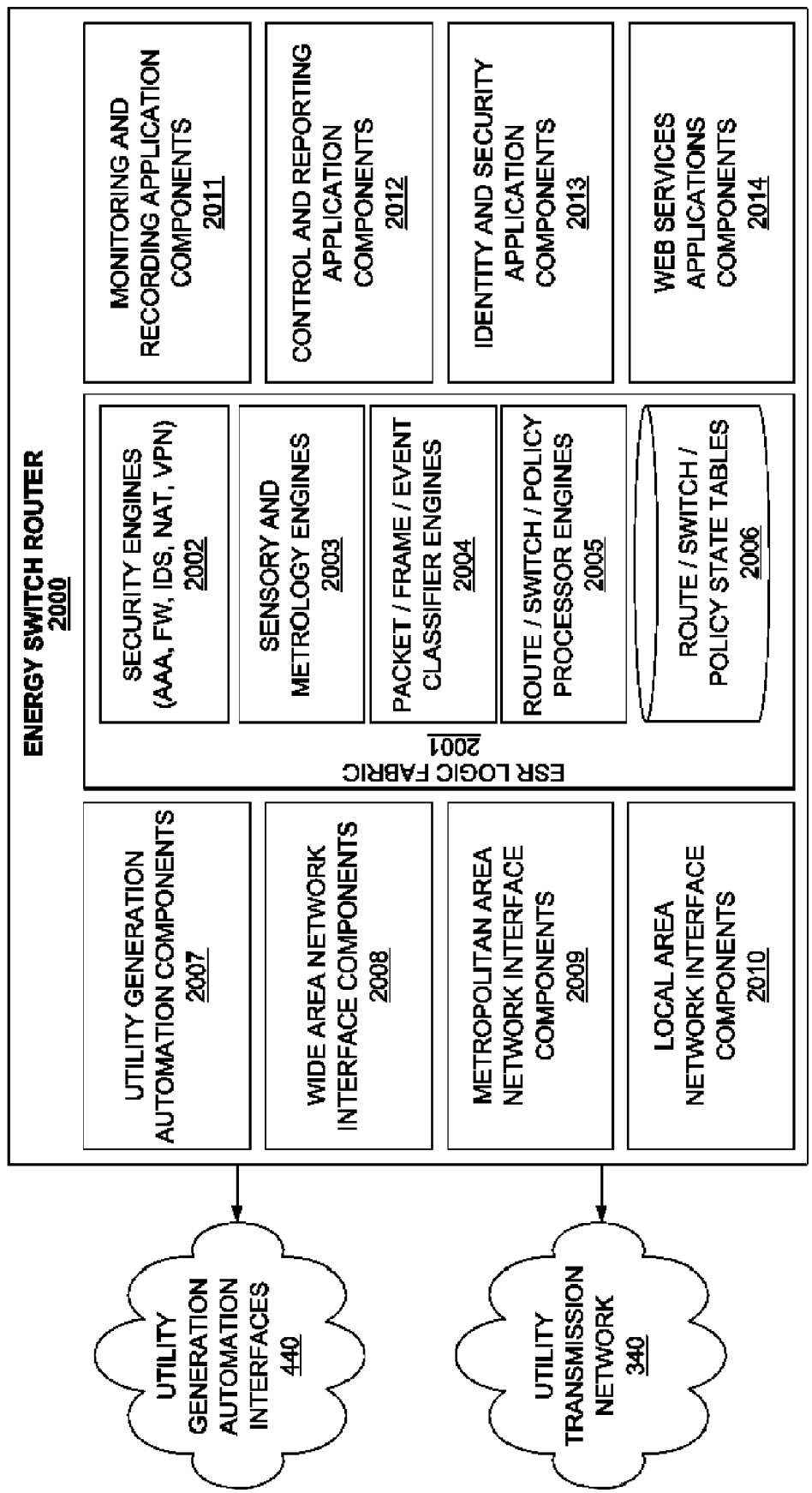
FIG. 20 is a is a block diagram depicting a utility generation automation energy switch router device that enables a policy networking-based predictive, self-adaptive, self-optimizing, fault-sensing, self-healing, and secure intelligent electric grid network, and which is configured and accessed via secure web services interfaces, in one embodiment according to the present invention.

FIG. 20 is an embodiment of ESR 2000 for utility generation automation, located at a utility's generation plant, in one embodiment according to the present invention. ESR 2000 can include ESR logic fabric 2001, security engines 2002, sensory and metrology engines 2003, packet/frame/event classifier engines 2004, route/switch/policy processor engines 2005, and route/switch/policy state tables 2006. ESR 2000 may include utility generation automation components 2007, wide area network interface components 2008, metropolitan area network interface components 2009, local area network interface components 2010, monitoring and recording application components 2011, control and reporting application components 2012, identity and security application components 2013, and web services applications components 2014.

In various embodiments, ESR 2000 may communicate with and be provisioned using a policy-based configuration, analytics, and control mechanism via utility distribution network 1914 and/or utility generation automation interfaces 2015.

Figure 21:
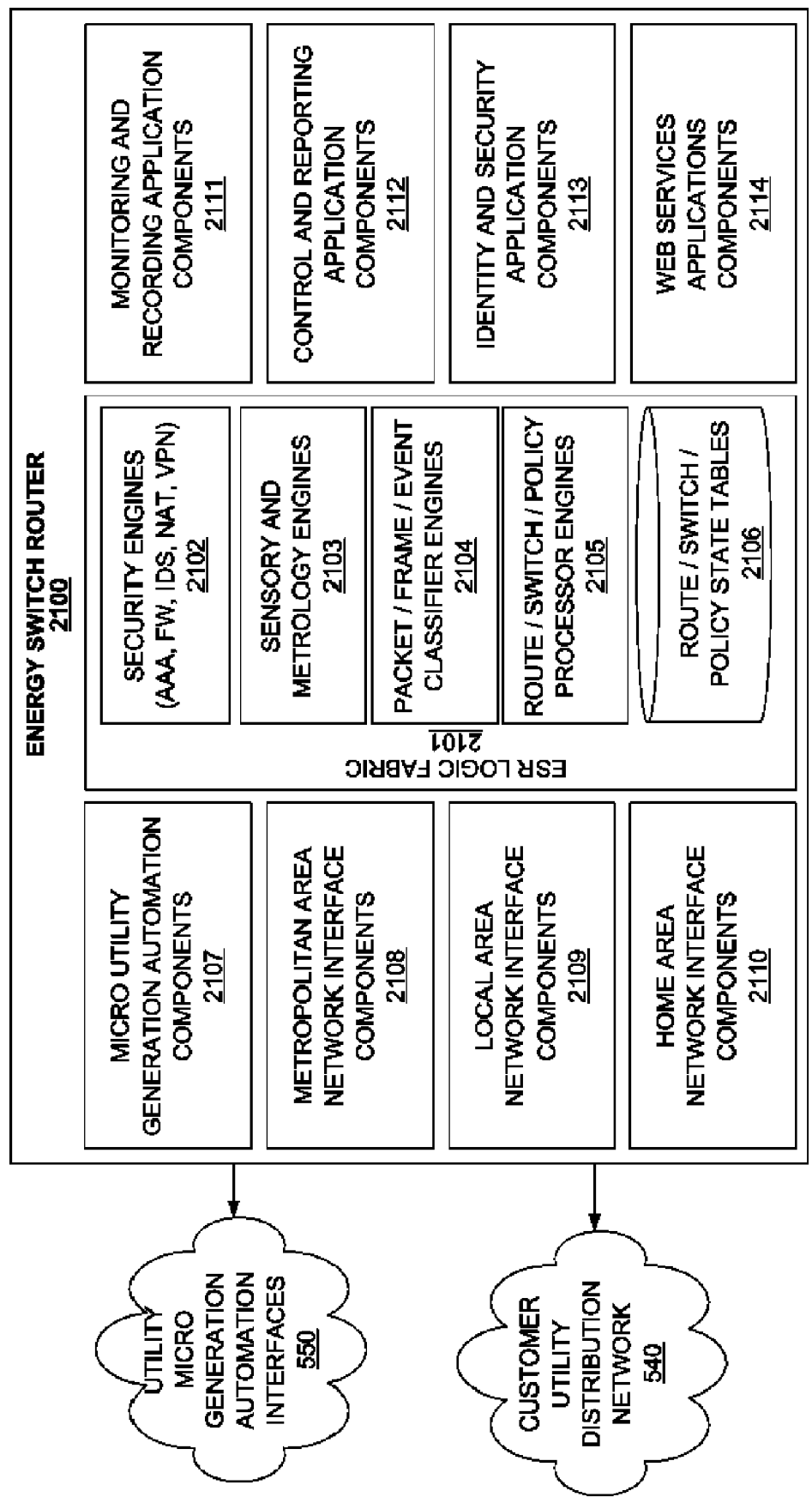
FIG. 21 is a is a block diagram depicting a utility micro generation automation energy switch router device that enables advanced micro generation automation and secure internetworking communications functions, and which is configured and accessed via secure web services interfaces.

FIG. 21 is an embodiment of ESR 2100 for utility micro generation automation, located at the customer's premises, in one embodiment according to the present invention. ESR 2100 can include ESR logic fabric 2101, security engines 2102, sensory and metrology engines 2103, packet/frame/event classifier engines 2104, route/switch/policy processor engines 2105, and route/switch/policy state tables 2106. ESR 2100 may include micro utility generation automation components 2107, metropolitan/wide area network interface components 2108, local area network interface components 2109, home area network interface components 2110, monitoring and recording application components 2111, control and reporting application components 2112, identity and security application components 2113, and web services applications components 2114.

In various embodiments, ESR 2100 may communicate with and be provisioned using a policy-based configuration, analytics, and control mechanism via customer utility distribution network 2115 and/or utility micro generation automation network 2116.

Figure 22:
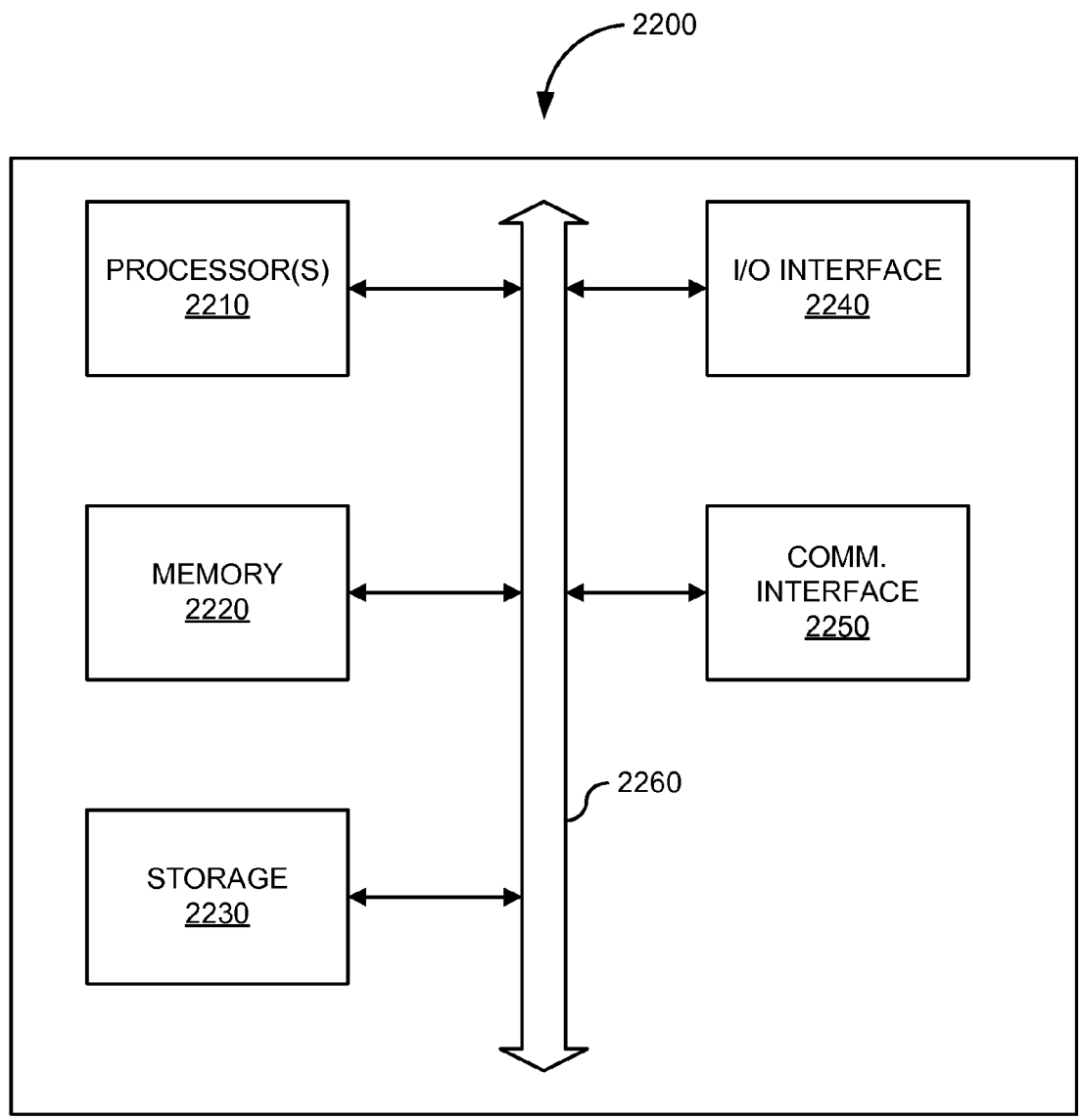
FIG. 22 is a block diagram of a computer system that may incorporate embodiments of the present invention.

FIG. 22 is a block diagram of computer system 2200 that may incorporate embodiments of the present invention. FIG. 22 is merely illustrative of an embodiment incorporating the present invention and does not limit the scope of the invention as recited in the claims. One of ordinary skill in the art would recognize other variations, modifications, and alternatives.

As shown in FIG. 22, computer system 2200 may include a processor(s) 2210 that communicates with a number of peripheral devices via a bus subsystem 2260. These peripheral devices may include memory (e.g., RAM or ROM) 2220, storage 2230, input/output (I/O) devices 2240, and communications interface 2250.

In some embodiment, computer system 2200 includes one or more microprocessors from Intel or Advanced Micro Devices (AMD) as processor(s) 2210. Further, one embodiment, computer system 2200 includes a LINUX or UNIX-based operating system.

Memory 2220 and storage 2230 are examples of tangible media configured to store data such as embodiments of the present invention, including executable computer code, human readable code, or the like. Other types of tangible media include floppy disks, removable hard disks, optical storage media such as CD-ROMs, DVDs and bar codes, semiconductor memories such as flash memories, read-only-memories (ROMS), battery-backed volatile memories, networked storage devices, and the like. Memory 2220 and storage 2230 may be configured to store the basic programming and data constructs that provide the functionality of the present invention.

Software code modules and instructions that provide the functionality of the present invention may be stored in Memory 2220 and storage 2230. These software modules may be executed by processor(s) 2210. Memory 2220 and storage 2230 may also provide a repository for storing data used in accordance with the present invention.

I/O interface 2240 may interface with all possible types of devices and mechanisms for inputting information to computer system 2200 and outputting information from computer system 2200. These may include a keyboard, a keypad, a touch screen incorporated into the display, audio input devices such as voice recognition systems, microphones, and other types of input devices. In various embodiments, user input devices are typically embodied as a computer mouse, a trackball, a track pad, a joystick, wireless remote, drawing tablet, voice command system, eye tracking system, and the like. These user input devices typically allow a user to select objects, icons, text, and the like, that appear on a monitor or display device via a command such as a click of a button or the like. User output devices may include all possible types of devices and mechanisms for outputting information from computer system 2200. These may include a display, a monitor, non-visual displays such as audio output devices, etc.

Communications interface 2250 provides an interface to other communication networks and devices. Communications interface 2250 may serve as an interface for receiving data from and transmitting data to other systems. Embodiments of communications interface 2250 typically include an Ethernet card, a modem (telephone, satellite, cable, ISDN), (asynchronous) digital subscriber line (DSL) unit, FireWire interface, USB interface, and the like. For example, communications interface 2250 may be coupled to a computer network, to a FireWire bus, or the like. In other embodiments, communications interfaces 2250 may be physically integrated on the motherboard of computer system 2200, and may be a software program, such as soft DSL, or the like.

In various embodiments, computer system 2200 may also include software that enables communications over a network such as the HTTP, TCP/IP, RTP/RTSP protocols, and the like. In alternative embodiments of the present invention, other communications software and transfer protocols may also be used, for example IPX, UDP or the like.

Bus subsystem 2260 provides a mechanism for letting the various components and subsystems of computer system 2200 communicate with each other as intended. Although bus subsystem 2260 is shown schematically as a single bus, alternative embodiments of the bus subsystem may utilize multiple busses.

FIG. 22 is representative of a computer system capable of embodying the present invention. It will be readily apparent to one of ordinary skill in the art that many other hardware and software configurations are suitable for use with the present invention. For example, the computer may be an embedded device, a desktop, a portable, a rack-mounted, or a tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

The specification and drawings are, accordingly, to be regarded in an illustrative rather than a restrictive sense. It will, however, be evident that various modifications and changes may be made thereunto without departing from the broader spirit and scope of the invention as set forth in the claims. The scope of the invention should, therefore, be determined not with reference to the above description, but instead should be determined with reference to the pending claims along with their full scope or equivalents.

What is claimed is:

1. A system for distributing a utility, the system comprising:
   a utility network operations center;
   a utility network comprising a plurality of distribution devices for distributing one or more utilities to one or more locations; and
   a plurality of metering devices coupled to the utility network, each metering device comprising:
     at least one network interface; and
     a logic fabric distributable at a plurality of locations comprising at least one of a distribution feeder and a customer premise, and configured to:
       receive information from the utility network operations center, wherein the information is based on a set of policies defining a measure of distribution of the utility over a utility grid, and wherein the set of policies is dynamically updatable, the set of policies comprising a configuration policy for energy switch routing operations, and wherein the configuration policy is deployed from a centralized location to a plurality of distributed energy switch routers,
       configure one or more of the distribution devices to distribute a utility based on, at least in part, the received information, and
       route communications related to the distribution of the utility via the at least one network interface.

2. The system of claim 1, wherein the network operations center is configured to provide web-based configuration of each of the plurality of metering devices.

3. The system of claim 1, wherein the network operations center is configured to generate at least a portion of the set of policies that provision each of the plurality of metering devices.

4. The system of claim 1, wherein one or more of the plurality of metering devices are configured to interface with electrical transmission devices.

5. The system of claim 1, wherein one or more of the plurality of metering devices are configured to interface with electrical generation devices.

6. The system of claim 1, wherein the logic fabric is configured to route communications between the metering device and the network operations center via the at least one network interface.

7. The system of claim 1, wherein the logic fabric is configured to route communications between the metering device and one or more of the plurality of metering devices via the at least one network interface.

8. The system of claim 1, wherein the logic fabric is configured to route communications between the network operations center and one or more of the plurality of metering devices via the at least one network interface.

9. The system of claim 1, wherein the logic fabric is configured to route communications to an Internet service provider via a home area network interface configured to enable access to the Internet to one or more devices associated with a customer's premises.

10. The system of claim 1, wherein the at least one network interface is selected from a group of interfaces consisting of:
   a wide area network interface,
   a metropolitan area network interface,
   a local area network interface,
   a home area network interface,
   a wireless local area network interface;
   a WiMAX interface,
   a 3GPP LTE interface,
   a WiFi interface, and
   a ZigBee interface.

11. The system of claim 1, wherein the plurality of network devices are selected from a group of network devices consisting of:
   a network device located at a utility transmission substation,
   a network device located at a utility transmission feeder,
   a network device located at a utility distribution substation,
   a network device located at a utility distribution feeder, and
   a network device located at a customer premise.

12. The system of claim 1, wherein each of the plurality of network devices is provided with a particular policy.

13. A method for providing a utility, the method comprising:
   receiving provisioning information at a networked metering device, wherein the information is based on a set of policies defining a measure of distribution of a utility over a utility grid, and wherein the set of policies is dynamically updatable, the set of policies comprising a configuration policy for energy switch routing operations, and wherein the configuration policy is deployed from a centralized location to a plurality of distributed energy switch routers;
   configuring a logic fabric at the networked metering device distributable at a plurality of locations comprising at least one of a distribution feeder and a customer premise, based on the provisioning information, configuring the logic fabric comprising:
   configuring a sensor engine to perform a metrology function based on the set of policies using information associated with one or more sensor devices; and
   routing communications related to the metrology function to a network via at least one network interface.

\* \* \* \* \*